(12) United States Patent
Kommula et al.

(10) Patent No.: US 10,530,678 B2
(45) Date of Patent: Jan. 7, 2020

(54) METHODS AND APPARATUS TO OPTIMIZE PACKET FLOW AMONG VIRTUALIZED SERVERS

(71) Applicant: VMware Inc., Palo Alto, CA (US)

(72) Inventors: Raja Kommula, Cupertino, CA (US); Raj Yavatkar, Saratoga, CA (US); Priyanka Tembey, San Francisco, CA (US)

(73) Assignee: VMWARE, INC, Palo Alto, CA (US)

( * ) Notice: Subject to any disclaimer, the term of this patent is extended or adjusted under 35 U.S.C. 154(b) by 145 days.

(21) Appl. No.: 15/655,197

(22) Filed: Jul. 20, 2017

(65) Prior Publication Data

US 2019/0028382 A1 Jan. 24, 2019

(51) Int. Cl.
| | |
|---|---|
| H04L 12/729 | (2013.01) |
| H04L 29/08 | (2006.01) |
| G06F 9/48 | (2006.01) |
| H04L 12/721 | (2013.01) |
| G06F 9/455 | (2018.01) |

(52) U.S. Cl.
CPC .......... H04L 45/125 (2013.01); G06F 9/4856 (2013.01); H04L 67/148 (2013.01); *G06F 9/45558* (2013.01); *H04L 45/38* (2013.01); *H04L 45/70* (2013.01)

(58) Field of Classification Search
CPC . G06F 9/45558; G06F 9/4856; H04L 45/125; H04L 45/38; H04L 45/70; H04L 67/148; H04L 47/2433; H04L 69/22
See application file for complete search history.

(56) References Cited

U.S. PATENT DOCUMENTS

| | | | |
|---|---|---|---|
| 7,460,472 B2 | 12/2008 | Le et al. | |
| 7,483,376 B2 | 1/2009 | Banerjee et al. | |
| 7,609,721 B2 | 10/2009 | Rao et al. | |
| 7,640,292 B1 * | 12/2009 | Smoot | G06F 9/45558 709/202 |
| 8,121,135 B2 | 2/2012 | Thathapudi et al. | |

(Continued)

FOREIGN PATENT DOCUMENTS

| | | |
|---|---|---|
| WO | 2016/123293 | 8/2016 |
| WO | 2016123293 | 8/2016 |

OTHER PUBLICATIONS

International Searching Authority, "International Search Report and Written Opinion," issued in connection with application No. PCT/US2018/043116, dated Oct. 18, 2018, 12 pages.

(Continued)

*Primary Examiner* — Alina A Boutah
(74) *Attorney, Agent, or Firm* — Hanley, Flight & Zimmerman LLC

(57) ABSTRACT

Methods, apparatus, systems, and articles of manufacture are disclosed. An example apparatus includes a packet analyzer to determine that a first virtualized server is preparing to migrate to a second virtualized server based on a data packet, a packet flow path generator to identify a set of network switches between the first virtualized server and the second virtualized server when the first virtualized server is in a different rackmount server than the second virtualized server, and a policy adjustor to adjust a policy of one or more network switches in the set to prioritize a packet flow corresponding to the migration.

26 Claims, 11 Drawing Sheets

(56) References Cited

U.S. PATENT DOCUMENTS

| | | |
|---|---|---|
| 8,576,847 B2 | 11/2013 | Hegde et al. |
| 2005/0041635 A1 | 2/2005 | Chung et al. |
| 2006/0080425 A1 | 4/2006 | Wood et al. |
| 2008/0104252 A1 | 5/2008 | Henniger |
| 2008/0320108 A1 | 12/2008 | Murty et al. |
| 2009/0019515 A1* | 1/2009 | Excoffier ............... G06F 21/604 726/1 |
| 2009/0262741 A1* | 10/2009 | Jungck ............ H04L 29/12066 370/392 |
| 2009/0292858 A1* | 11/2009 | Lambeth ........... H04L 29/12839 711/6 |
| 2011/0032935 A1 | 2/2011 | Yang |
| 2011/0302346 A1* | 12/2011 | Vahdat .................... H04L 49/40 710/301 |
| 2012/0051236 A1 | 3/2012 | Hegde et al. |
| 2012/0213070 A1 | 8/2012 | Lee et al. |
| 2013/0044748 A1* | 2/2013 | Shah ...................... H04L 12/413 370/355 |
| 2013/0124702 A1 | 5/2013 | Shah et al. |
| 2013/0145072 A1 | 6/2013 | Venkataraghavan et al. |
| 2013/0223454 A1* | 8/2013 | Dunbar ................... H04L 45/44 370/400 |
| 2014/0050217 A1* | 2/2014 | Janakiraman ........... H04L 49/10 370/389 |
| 2014/0164640 A1 | 6/2014 | Ye et al. |
| 2014/0241203 A1* | 8/2014 | Elson ...................... H04L 41/12 370/254 |
| 2014/0372616 A1* | 12/2014 | Arisoylu ............. H04L 67/1002 709/226 |
| 2015/0043379 A1* | 2/2015 | Shimokuni ........... H04L 45/586 370/254 |
| 2015/0071067 A1 | 3/2015 | Martin et al. |
| 2015/0071072 A1* | 3/2015 | Ratzin ..................... H04L 47/11 370/235 |
| 2015/0078152 A1* | 3/2015 | Garg ................... H04L 41/0668 370/219 |
| 2015/0092561 A1 | 4/2015 | Sigoure |
| 2015/0163117 A1* | 6/2015 | Lambeth ............. H04L 47/2441 709/224 |
| 2015/0277952 A1* | 10/2015 | Lin ..................... G06F 9/45558 711/114 |
| 2016/0065423 A1 | 3/2016 | Zhang et al. |
| 2016/0072642 A1* | 3/2016 | Shih .................... H04L 12/4666 370/392 |
| 2016/0105343 A1* | 4/2016 | Janarthanan ........ H04L 43/0876 370/252 |
| 2016/0105364 A1* | 4/2016 | Kanonakis .............. H04L 47/10 370/235 |
| 2016/0283259 A1* | 9/2016 | Mehta ................. G06F 9/45558 |
| 2017/0149880 A1 | 5/2017 | Lochhead et al. |
| 2017/0163539 A1* | 6/2017 | Sreeramoju ........... H04L 47/125 |
| 2017/0195226 A1 | 7/2017 | Cho et al. |
| 2017/0244651 A1 | 8/2017 | Saxton |
| 2017/0286167 A1 | 10/2017 | Zhu |
| 2017/0331740 A1* | 11/2017 | Levy ....................... H04L 47/12 |
| 2017/0353874 A1* | 12/2017 | Harrang ................ H04W 24/08 |
| 2017/0366401 A1 | 12/2017 | Jiang et al. |
| 2018/0004558 A1* | 1/2018 | Das Sharma ....... G06F 12/1081 |
| 2018/0013583 A1 | 1/2018 | Rubenstein et al. |
| 2018/0026895 A1* | 1/2018 | Wang .................... H04L 41/142 370/235 |
| 2018/0091591 A1* | 3/2018 | Puri ..................... H04L 67/1095 |
| 2018/0097734 A1* | 4/2018 | Boutros ................ H04L 47/125 |
| 2018/0139101 A1* | 5/2018 | Puri ........................ H04L 41/12 |
| 2018/0183683 A1* | 6/2018 | Geng .................. H04L 41/0816 |
| 2018/0241664 A1 | 8/2018 | Singh et al. |
| 2018/0316618 A1* | 11/2018 | Brown ................ H04L 47/2441 |
| 2018/0343162 A1 | 11/2018 | Ohsuga et al. |
| 2018/0359131 A1* | 12/2018 | Cheng ................. H04L 41/0226 |
| 2018/0373553 A1* | 12/2018 | Connor ............... G06F 9/45558 |
| 2019/0028342 A1 | 1/2019 | Kommula et al. |
| 2019/0028345 A1 | 1/2019 | Kommula et al. |
| 2019/0028400 A1 | 1/2019 | Kommula et al. |

OTHER PUBLICATIONS

United States Patent and Trademark Office, "Non-Final Office Action," issued in connection with application No. 15/655,632, dated Dec. 21, 2018, 16 pages. (This is a USPTO document. Applicant will provide document upon request from Examiner.).

United States Patent and Trademark Office, "Non-Final Office Action," issued in connection with U.S. Appl. No. 15/655,193, dated Jan. 29, 2019, 13 pages.

United States Patent and Trademark Office, "Non-Final Office Action," issued in connection with U.S. Appl. No. 15/655,625, dated Feb. 26, 2019, 30 pages.

United States Patent and Trademark Office, "Final Office Action," dated Jun. 10, 2019 in connection with U.S. Appl. No. 15/655,632 (16 pages).

United States Patent and Trademark Office, "Final Office Action," dated Jul. 22, 2019 in connection with U.S. Appl. No. 15/655,193 (15 pages).

United States Patent and Trademark Office, "Final Office Action," dated Sep. 4, 2019 in connection with U.S. Appl. No. 15/655,625, 28 pages.

* cited by examiner

```
switch_list = {set of all TORs and Spines in VCF}
foreach switch in switch_list
        Adjust QoS policy
        if L2 ECMP or L3 ECMP
                Calculate packet flow bandwidth
                Migrate existing packet flows and free up one or more data lines
                Adjust ECMP hash so that packet flow F uses the one or more free data lines
        endif
endfor
```

FIG. 10

```
num_ecmp = number of ECMP data lines between two network switches
data_line_speed = speed of each data line
packet_flow_size = Size of VM going through vMotion or size of elephant flow num_data_lines_needed = packet_flow_size / data_line_speed
if num_data_lines_needed > (num_ecmp / 2)
        // Do not use more than half the data lines
        num_data_lines_needed = num_ecmp / 2
endif
```

FIG. 11

METHODS AND APPARATUS TO OPTIMIZE PACKET FLOW AMONG VIRTUALIZED SERVERS

FIELD OF THE DISCLOSURE

The present disclosure relates generally to cloud computing and, more particularly, to methods and apparatus to optimize packet flow among virtualized servers.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 10 depicts example source code representative of example computer readable instructions that may be executed to implement the example analytics engine and/or the example decision engine of FIGS. 3-4 that may be used to implement the examples disclosed herein.

FIG. 11 depicts example source code representative of example computer readable instructions that may be executed to implement the example analytics engine and/or the example decision engine of FIGS. 3-4 that may be used to implement the examples disclosed herein.

DETAILED DESCRIPTION

Figure 1:
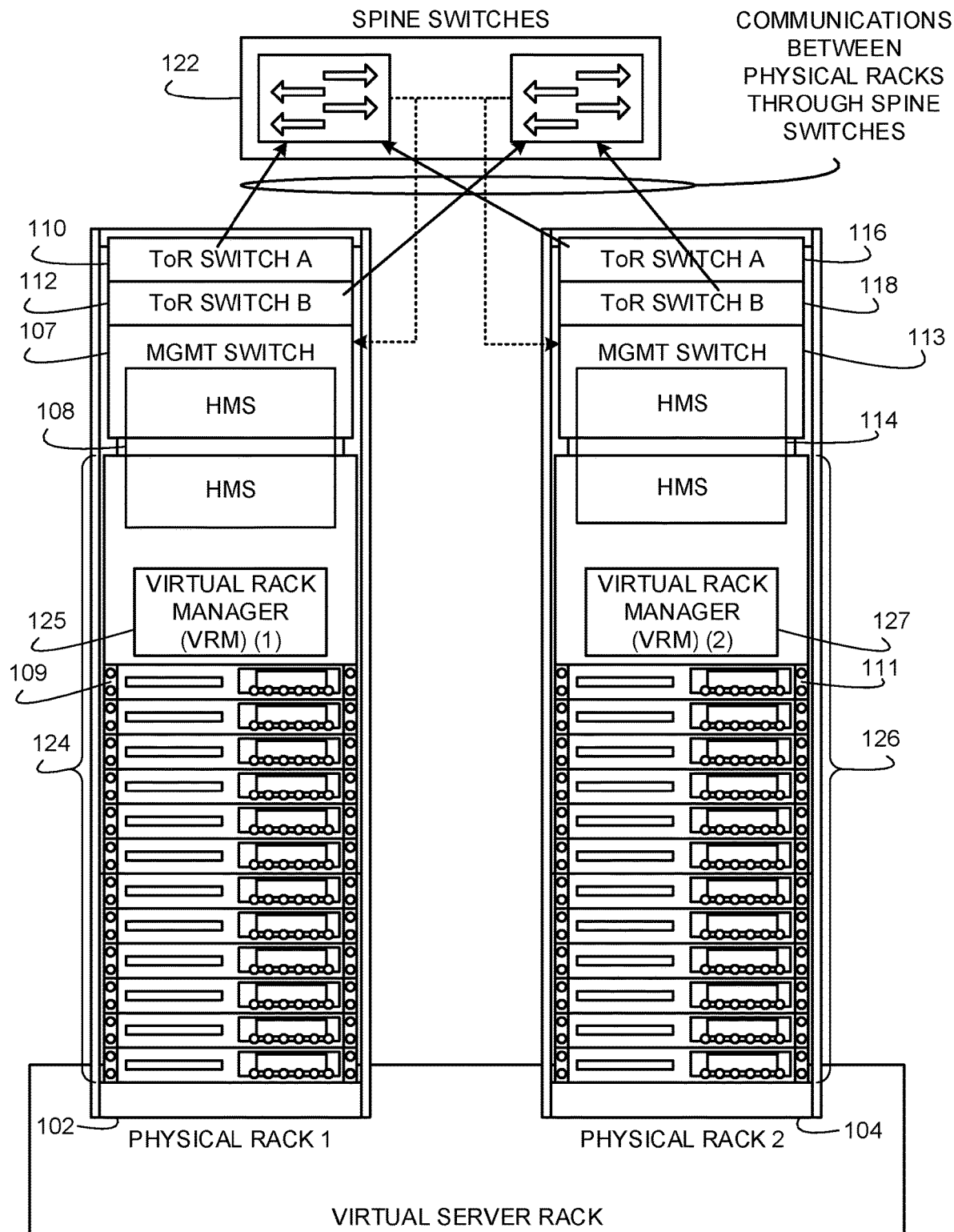
FIG. 1 depicts example physical racks in an example virtual server rack deployment.

Cloud computing is based on the deployment of many physical resources across a network, virtualizing the physical resources into virtual resources, and provisioning the virtual resources in software defined data centers (SDDCs) for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on Hyper-Converged Infrastructure (HCI). In examples disclosed herein, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein may be used with one or more different types of virtualization environments. Three example types of virtualization environment are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs, virtual storage, virtual networks and their control/management counterparts) and the physical infrastructure (servers, physical storage, network switches).

Prior converged and hyper-converged systems enable deploying and operating private clouds by offering an integrated system. However, most of such prior products lack a single governing entity that has visibility into and end-to-end control over an entire (virtual and physical) infrastructure. The lack of a single governing entity makes it difficult to correlate related events such as relating switch congestion to a particular traffic source in a VM, or taking preemptive traffic management action (e.g., a scheduled VM migration event could be used to proactively select an end-to-end network path that does not impact the software-defined data storage traffic), or reflecting network I/O control (NIOC) (e.g., VMWARE ESXI NIOC) configurations at the switch level for end-to-end Quality of Storage (QoS) control during traffic events like software-defined data storage rebalancing. Examples disclosed herein overcome limitations of prior systems by enabling observing and controlling both virtual and physical infrastructures of self-contained private clouds. Examples disclosed herein collect telematics data from switches, hosts, and hypervisor-based virtual infrastructure and take remedial actions based on telematics analyses and user configured policies.

Examples disclosed herein may be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches) and spine switches connected using a Leaf-Spine architecture. A virtual server rack system also includes software-defined data storage (e.g., storage area network (SAN), VWWARE® VIRTUAL SAN™) distributed across multiple hosts for redundancy and virtualized networking software (e.g., VMWARE NSX™).

A drawback of some virtual server rack systems is that different hardware components located therein can be procured from different equipment vendors, and each equipment vendor can have its own independent OS (OS) installed on its hardware. For example, physical hardware resources include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration may require additional network bandwidth, which may not be released until the reconfiguration is complete.

Examples disclosed herein provide HCI-based SDDCs with system-level governing features that can actively monitor and manage different hardware and software components of a virtual server rack system even when such different hardware and software components execute different OSs. As described in connection with FIG. 2, major components of a virtual server rack system include a hypervisor, network virtualization software, storage virtualization software (e.g., software-defined data storage), a physical network OS, and external storage. In some examples, the storage virtualization (e.g., VMWARE VIRTUAL SAN™) is integrated with the hypervisor. In examples in which the physical network OS is isolated from the network virtualization software, the physical network is not aware of events occurring in the network virtualization environment and the network virtualization environment is not aware of events occurring in the physical network.

Examples disclosed herein improve packet flow among virtualized servers of prior systems by adjusting a packet flow path based on a temporary event. In disclosed examples herein, the packet flow path can be adjusted by identifying a source and a destination of the packet flow and adjusting one or more packet flow policies to optimize available routing resources. As used herein, the term "packet flow path" refers to one or more network switches such as ToR switches, spline switches, etc., between a source and a destination of a transmitted data packet. As used herein, the term "packet flow" refers to one or more data packets being transmitted from a source to a destination. For example, a packet flow may include a VM migration, a significantly large continuous flow (e.g., an elephant flow), etc. In some examples disclosed herein, a list of network switches between a source and a destination host are generated. Examples disclosed herein adjust one or more packet flow policies of a network switch in the list to improve the packet flow. For example, a Quality-of-Service (QoS) policy of a network switch may be adjusted to prioritize the packet flow. In another or the same example, an equal-cost multi-path (ECMP) hash algorithm may be adjusted to redistribute existing flow paths and data lines to improve the packet flow. In response to completing an execution of the packet flow, examples disclosed herein restore the one or more packet flow policies to previous packet flow policies, where the previous packet flow policies operated prior to the packet flow (e.g., prior to the VM migration, the elephant flow, etc.).

FIG. 1 depicts example physical racks 102, 104 in an example deployment of a virtual server rack 106. The virtual server rack 106 of the illustrated example enables abstracting hardware resources (e.g., physical hardware resources 124, 126). In some examples, the virtual server rack 106 includes a set of physical units (e.g., one or more racks) with each unit including hardware such as server nodes (e.g., compute+storage+network links), network switches, and, optionally, separate storage units. From a user perspective, the example virtual server rack 106 is an aggregated pool of logic resources exposed as one or more VMWARE ESXI™ clusters along with a logical storage pool and network connectivity. In examples disclosed herein, a cluster is a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR switch A 210, an example ToR switch B 112, an example management switch 107, and an example server host node(0) 109. In the illustrated example, the management switch 107 and the server host node(0) 109 run a hardware management system (HMS) 108 for the first physical rack 102. The second physical rack 104 of the illustrated example is also provided with an example ToR switch A 116, an example ToR switch B 118, an example management switch 113, and an example server host node (0) 111. In the illustrated example, the management switch 113 and the server host node (0) 111 run an HMS 114 for the second physical rack 104.

In the illustrated example, the HMS 108, 114 connects to server management ports of the server host node(0) 109, 111 (e.g., using a baseboard management controller (BMC)), connects to ToR switch management ports (e.g., using 1 gigabits per second (Gbps) links) of the ToR switches 110, 112, 116, 118, and also connects to spine switch management ports of one or more spine switches 122. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private Internet protocol (IP) management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management. In examples disclosed herein, the ToR switches 110, 112, 116, 118 connect to server NIC ports (e.g., using 10 Gbps links) of server hosts in the physical racks 102, 104 for downlink communications and to the spine switch(es) 122 (e.g., using 40 Gbps links) for uplink communications. In the illustrated example, the management switch 107, 113 is also connected to the ToR switches 110, 112, 116, 118 (e.g., using a 10 Gbps link) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126) of the physical rack 102, 104. In the illustrated example, the IB connection interfaces to physical hardware resources 124, 126 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of nonresponsive hosts, monitoring catastrophic hardware failures, and firmware upgrades. The example HMS 108, 114 uses IB management to periodically monitor status and health of the physical resources 124, 126 and to keep server objects and switch objects up to date. Example IB operations performed by the HMS 108, 114 include controlling power state, accessing temperature sensors, controlling Basic Input/Output System (BIOS) inventory of hardware (e.g., central processing units (CPUs), memory, disks, etc.), event monitoring, and logging events.

The HMSs 108, 114 of the corresponding physical racks 102, 104 interface with virtual rack managers (VRMs) 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the VRM 125 of the first physical rack 102 runs on a cluster of three server host nodes of the first physical rack 102, one of which is the server host node(0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the VRM 127 of the second physical rack 104 runs on a cluster of three server host nodes of the second physical rack 104, one of which is the server host node(0) 111. In the illustrated example, the VRMs 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The VRM 125 of the first physical rack 102 runs on a cluster of three server host nodes of the first physical rack 102 using a high availability (HA) mode configuration. In addition, the VRM 127 of the second physical rack 104 runs on a cluster of three server host nodes of the second physical rack 104 using the HA mode configuration. Using the HA mode in this manner, enables fault tolerant operation of the VRM 125, 127 in the event that one of the three server host nodes in the cluster for the VRM 125, 127 fails. Upon failure of a server host node executing the VRM 125, 127, the VRM 125, 127 can be restarted to execute on another one of the hosts in the cluster. Therefore, the VRM 125, 127 continues to be available even in the event of a failure of one of the server host nodes in the cluster.

In examples disclosed herein, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.).

There is also a configuration buffer as part of the switch object which stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113) in the physical rack 102, 104. However, any other programming language and any other OS may be used to implement the HMS 108, 114.

Figure 2:
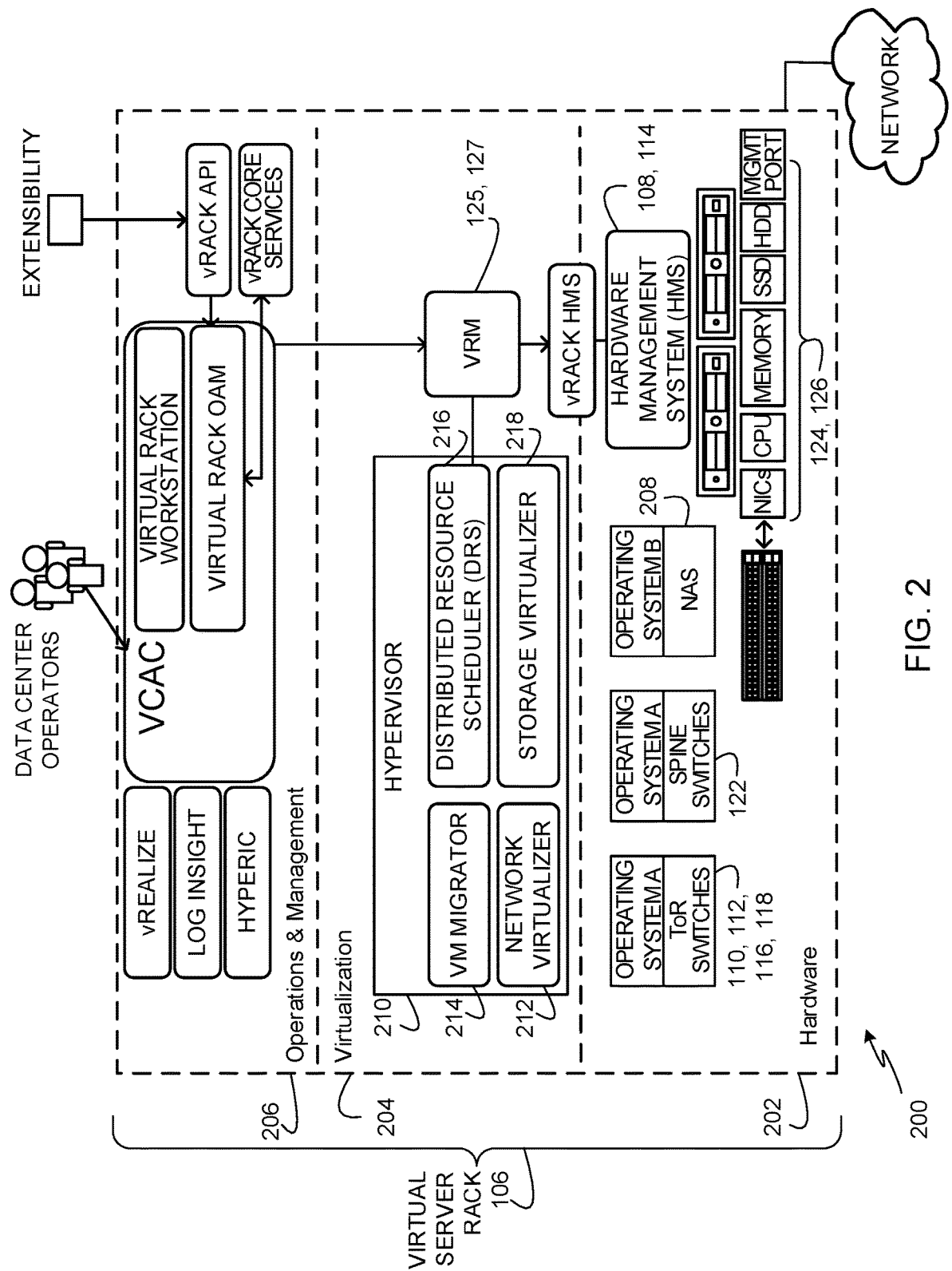
FIG. 2 depicts an example architecture to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes a hardware layer 202, a virtualization layer 204, and an operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126, virtualizes the physical hardware resources 124, 126 into virtual resources, provisions virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 208. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host nodes(0) 109, 111 and the ToR switches 110, 112, 116, 118. In the illustrated example, one instance of the HMS 108, 114 runs per physical rack 102, 104. For example, the HMS 108, 114 may run on the management switch 107, 113 and the server host node(0) 109, 111 installed in the example physical rack 102 of FIG. 1. In the illustrated example of FIG. 1 both of the HMSs 108, 114 are provided in corresponding management switches 107, 113 and the corresponding server host nodes(0) 109, 111 as a redundancy feature in which one of the HMSs 108, 114 is a primary HMS, while the other one of the HMSs 108, 114 is a secondary HMS. In this manner, one of the HMSs 108, 114 may take over as a primary HMS in the event of a failure of a management switch 107, 113 and/or a failure of the server host nodes(0) 109, 111 on which the other HMS 108, 114 executes. In some examples, to achieve seamless failover, two instances of an HMS 108, 114 run in a single physical rack 102, 104. In such examples, the physical rack 102, 104 is provided with two management switches, and each of the two management switches runs a separate instance of the HMS 108, 114. In such examples, the physical rack 102 of FIG. 1 runs two instances of the HMS 108 on two separate physical hardware management switches and two separate server host nodes(0), and the physical rack 104 of FIG. 1 runs two instances of the HMS 114 on two separate physical hardware management switches and two separate server host nodes(0). In this manner, for example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes(0) in the physical rack 102 (or the two instances of the HMS 114 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 204 includes the VRM 125, 127. The example VRM 125, 127 communicates with the HMS 108, 114 to manage the physical hardware resources 124, 126. The example VRM 125, 127 creates the example virtual server rack 106 out of underlying physical hardware resources 124, 126 that may span one or more physical racks (or smaller units such as a hyper-appliance or half rack) and handles physical management of those resources. The example VRM 125, 127 uses the virtual server rack 106 as a basis of aggregation to create and provide operational views, handle fault domains, and scale to accommodate workload profiles. The example VRM 125, 127 keeps track of available capacity in the virtual server rack 106, maintains a view of a logical pool of virtual resources throughout the SDDC life-cycle, and translates logical resource provisioning to allocation of physical hardware resources 124, 126. The example VRM 125, 127 interfaces with an example hypervisor 210 of the virtualization layer 204. The example hypervisor 210 is installed and runs on server hosts in the example physical resources 124, 126 to enable the server hosts to be partitioned into multiple logical servers to create VMs. In some examples, the hypervisor 210 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources In the illustrated example of FIG. 2, the hypervisor 210 is shown having a number of virtualization components executing thereon including an example network virtualizer 212, an example VM migrator 214, an example distributed resource scheduler (DRS) 216, and an example storage virtualizer 218. In the illustrated example, the VRM 125, 127 communicates with these components to manage and present the logical view of underlying resources such as hosts and clusters. The example VRM 125, 127 also uses the logical view for orchestration and provisioning of workloads.

The example network virtualizer 212 virtualizes network resources such as physical hardware switches (e.g., the management switches 107, 113 of FIG. 1, the ToR switches 110, 112, 116, 118, and/or the spine switches 122) to provide software-based virtual networks. The example network virtualizer 212 enables treating physical network resources (e.g., switches) as a pool of transport capacity. In some examples, the network virtualizer 212 also provides network and security services to VMs with a policy driven approach. The example network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on a server host. In some examples, the network virtualizer 212 may be implemented using a VMWARE NSX™ network virtualization platform that includes a number of components including a VMWARE NSX™ network virtualization manager.

The example VM migrator 214 is provided to move or migrate VMs between different hosts without losing state during such migrations. For example, the VM migrator 214 allows moving an entire running VM from one physical server to another with substantially little or no downtime. The migrating VM retains its network identity and connections, which results in a substantially seamless migration process. The example VM migrator 214 enables transferring the VM's active memory and precise execution state over a high-speed network, which allows the VM to switch from running on a source server host to running on a destination server host.

The example DRS 216 is provided to monitor resource utilization across resource pools, to manage resource allocations to different VMs, to deploy additional storage capacity to VM clusters with substantially little or no service disruptions, and to work with the VM migrator 214 to automatically migrate VMs during maintenance with substantially little or no service disruptions.

The example storage virtualizer 218 is software-defined storage for use in connection with virtualized environments. The example storage virtualizer 218 clusters server-attached hard disk drives (HDDs) and solid state drives (SSDs) to create a shared datastore for use as virtual storage resources in virtual environments. In some examples, the storage virtualizer 218 may be implemented using a VMWARE VIRTUAL SAN™ network data storage virtualization component developed and provided by VMware, Inc.

The virtualization layer 204 of the illustrated example, and its associated components are configured to run VMs. However, in other examples, the virtualization layer 204 may additionally and/or alternatively be configured to run containers. For example, the virtualization layer 204 may be used to deploy a VM as a data computer node with its own guest OS on a host using resources of the host. Additionally and/or alternatively, the virtualization layer 204 may be used to deploy a container as a data computer node that runs on top of a host OS without the need for a hypervisor or separate OS.

In the illustrated example, the OAM layer 206 is an extension of a VMWARE VCLOUD® AUTOMATION CENTER™ (VCAC) that relies on the VCAC functionality and also leverages utilities such as VMWARE VCENTER™ LOG INSIGHT™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMware, Inc. Alternatively, some or all of such components may alternatively be supplied by components with the same and/or similar features developed and/or provided by other virtualization component developers.

Figure 3:
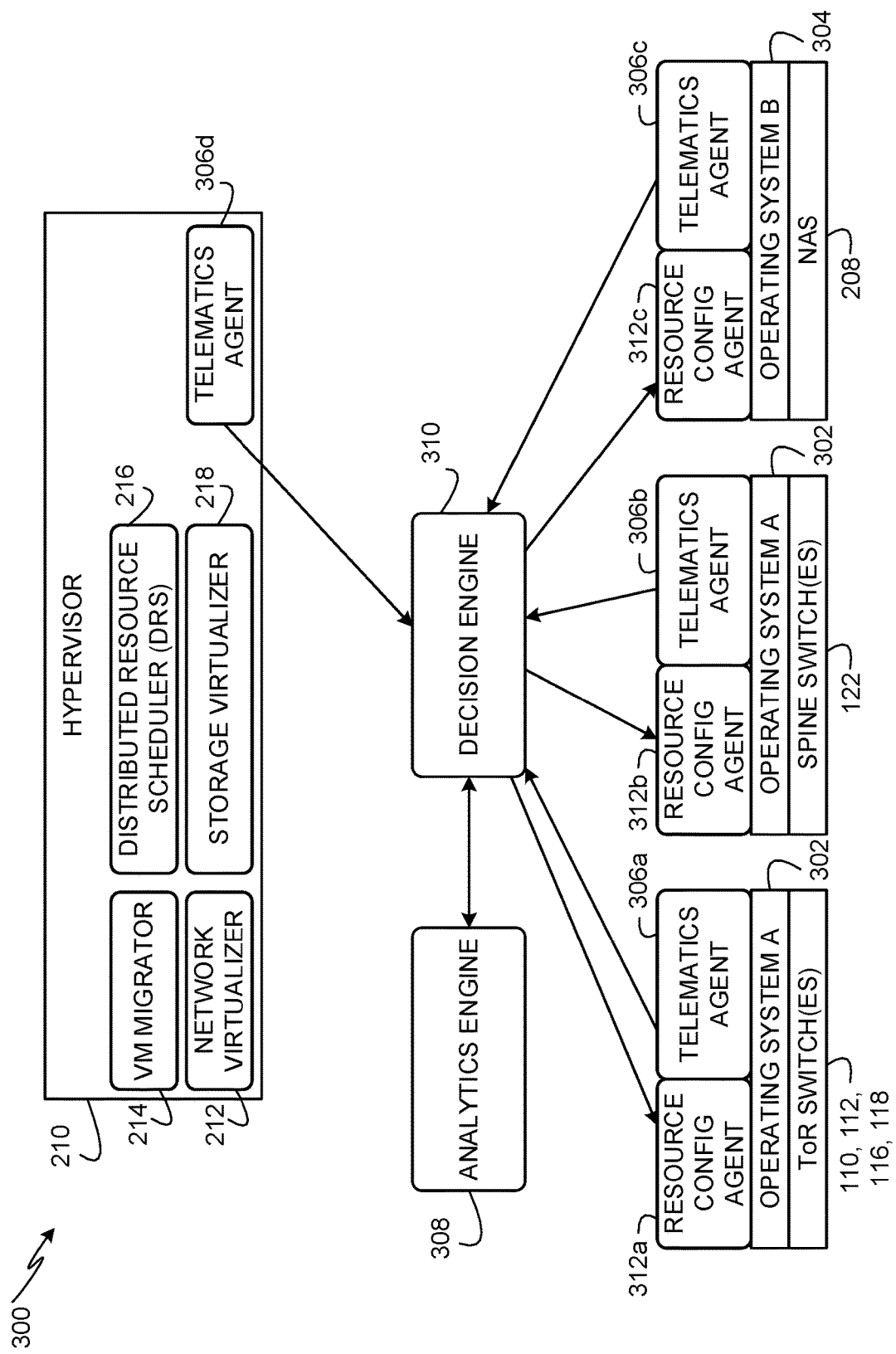
FIG. 3 depicts an example virtual cloud management system that may be used to implement examples disclosed herein.

FIG. 3 depicts an example virtual cloud management system 300 that may be used to implement examples disclosed herein. The example virtual cloud management system 300 includes the example network virtualizer 212, the example VM migrator 214, the example DRS 216, and the example storage virtualizer 218 of FIG. 2. In the illustrated example, the virtual cloud management system 300 is implemented using a SDDC deployment and management platform such as the VMware Cloud Foundation (VCF) platform developed and provided by VMware, Inc. The example virtual cloud management system 300 manages different parameters of the ToR switches 110, 112, 116, 118, the spine switches 122, and the NAS 208. The example virtual cloud management system 300 commands different components even when such components run different OSs. For example, the ToR switches 110, 112, 116, 118 and the spine switches 122 run OS A 302, and the NAS 208 runs OS B 304. In the illustrated example, the OS A 302 and the OS B 304 are different types of OSs. For example, the OS A 302 and the OS B 304 may be developed by different companies, may be developed for different hardware, maybe developed for different functionality, may include different kernels, and/or may be different in other ways. In some examples, the OS A 302 may be implemented using a Cisco NX-OS (developed and provided by Cisco Systems, Inc.) that can be run on leaf switches and/or spine switches, and the OS B 304 may be implemented using an EMC NAS OS (developed and provided by EMC Corporation) that runs on network attached storage devices. In the illustrated example of FIG. 3, the OS A 302 and the OS B 304 are unaware of the events occurring in the hypervisor 210. However, examples disclosed herein enable monitoring different OSs across physical resources at a system level to provides cooperative inter-OS and inter-resource management.

The example virtual cloud management system 300 includes example telematics agents 306a-d, an example analytics engine 308, an example decision engine 310, and example resource configuration agents 312a-c. In the illustrated example, the telematics agents 306a-d are provided to collect information from different hardware resources and provide the information to the example decision engine 310. In the illustrated example, the telematics agents 306a-d are provided as add-on modules installable and executable on the different components. For example, the telematics agent 306a is installed and executed on the OS A 302 of the ToR switches 110, 112, 116, 118, the example telematics agent 306b is installed and executed on the OS A 302 of the spine switches 122, the example telematics agent 306c is installed and executed on the OS B 304 of the NAS 208, and the example telematics agent 306d is installed and executed on the hypervisor 210. In the illustrated example, the telematics agents 306a-d run on respective components while creating substantially little or no interference to the OSs of those components. For example, the telematics agents 306a-d may be implemented as a set of Access Control List (ACL) rules that operate as data collection rules to capture signatures of events that are happening in the virtual cloud management system 300. Such data collection rules can include static rules and/or dynamic rules. Example data collection rules can be used to collect statistics for various packet flows, to detect starts of VM migrations, to detect starts of virtualized storage rebalancing, to collect virtual extensible local area network (VXLAN) flow statistics, to collect L2 hop counts between various media access control (MAC) addresses, to collect QoS statistics, to collect maximum transmission unit (MTU) configurations, to collect equal-cost multi-path (ECMP) routing hash policies, to collect routing changes, etc. The example telematics agents 306a-d collect such information periodically and send the telematics-collected information to the example decision engine 310 for analysis by the example analytics engine 308 and to identify subsequent responsive action based on such telematics-collected information.

The example decision engine 310 runs on a VM and is provided to make decisions based on analyses of the telematics-collected information received from the example telematics agents 306a-d. For example, the decision engine 310 can program the resource configuration agents 312a-c based on analyses of the telematics-collected information performed by the analytics engine 308. In some examples, the telematics-collected information is low-level primitive data, and the decision engine 310 is configured to identify high-level events based on such low-level primitive data. For example, if the telematics-collected information includes low-level primitive data indicative of statistics for various packet flows, the decision engine 310 may identify a high-level event such as a network misconfiguration or an under-provisioning of network resources based on too many packet drops for certain packet flows. In another example, if the telematics-collected information includes low-level primitive data that reflects the start of a VM migration, the decision engine 310 identifies an imminent need for a large amount of network bandwidth to perform such VM migration. In yet another example, if the telematics-collected information includes low-level primitive data that reflects the start of virtualized storage rebalancing, the decision engine 310 identifies an imminent burst of virtualized storage traffic based on the possibility that a disk is either being added or deleted. In yet another example, if the telematics-collected information includes low-level primitive data that reflects VXLAN flow statistics, the decision engine 310 identifies use of large amounts of network bandwidth based on VM network usage reflected in the VXLAN flow statistics. In yet another example, if the telematics-collected information includes low-level primitive data that reflects L2 hop counts between various MAC addresses, the decision engine 310 identifies an opportunity to migrate VMs closer to one another (e.g., migrate VMs to server hosts that are in the same physical rack or on neighboring physical racks) based on collected L2 hop count information in combination with VXLAN flow statistics.

The example analytics engine 308 runs on a VM and is provided to analyze the telematics-collected information received from the example telematics agents 306a-d. For example, the analytics engine 308 can perform big data analyses by periodically accessing the telematics-collected information and analyzing the information, for example, for any system misconfigurations and/or inconsistencies. Some example types of analyses include analyzing information collected using packet sniffers in physical switches to: detect elephant flows and optimize network resources to handle such elephant flows, identify security issues, identify out-of-order delivery of packets, identify network bottlenecks, identify MTU misconfigurations, etc. Another example type of analysis includes analyzing syslog (system log) messages to identify critical system issues.

The example resource configuration agents 312a-c provide hardware agnostic APIs, which can be accessed by the decision engine 310 to change hardware configurations of corresponding hardware resources (e.g., the ToR switches 110, 112, 116, 118; the spine switches 122; the NAS 208, etc.). In this manner, the example decision engine 310 can improve operating and/or communication performances and/or efficiencies of the virtual server rack 106 (FIG. 1) by programming configurations of hardware resources via the resource configuration agents 312a-c in response to different events detected based on the analyses of the telematics-collected information performed by the analytics engine 308.

Figure 4:
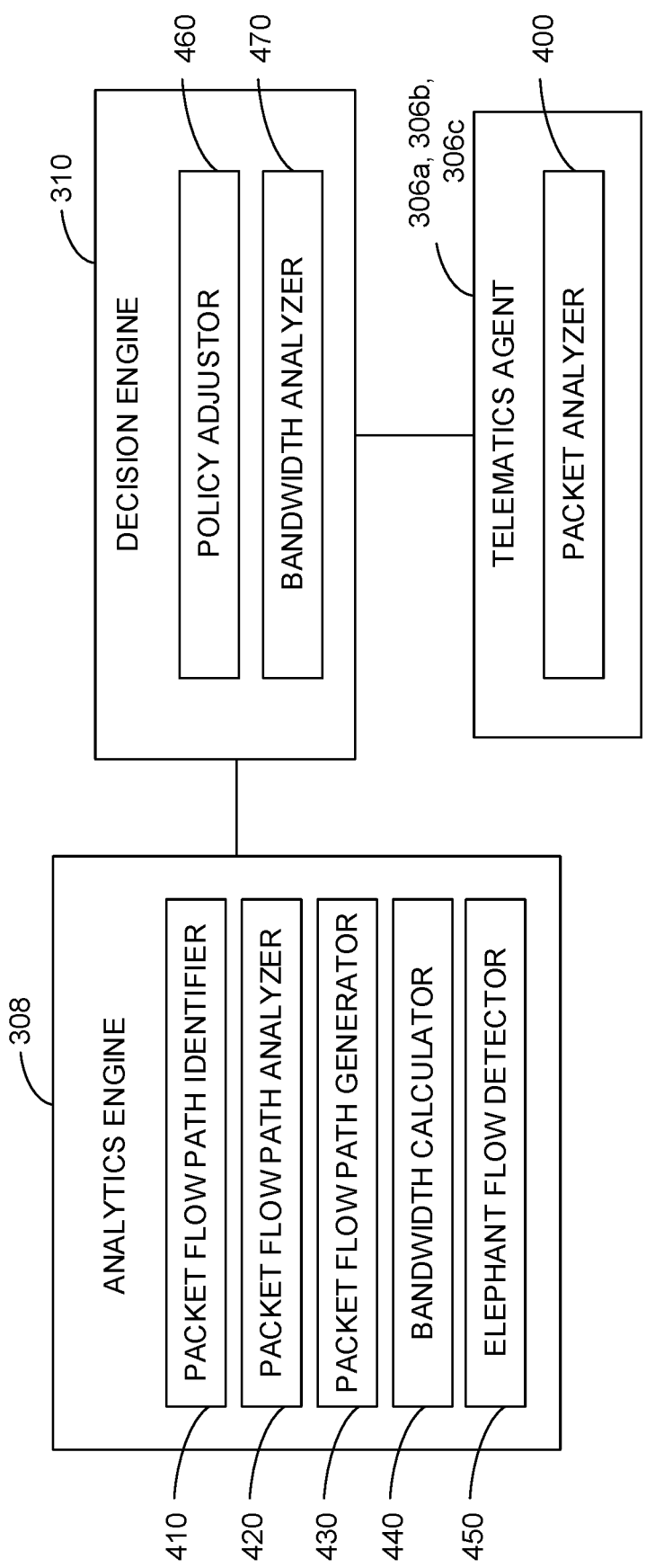
FIG. 4 depicts example telematics agents, an example analytics engine, and an example decision engine that may be used to implement examples disclosed herein.

FIG. 4 is a block diagram of an example implementation of the example telematics agents 306a-c of FIG. 3, the example analytics engine 308 of FIG. 3, and the example decision engine 310 of FIG. 3. In the illustrated example, the telematics agents 306a-c includes an example packet analyzer 400. In the illustrated example, the analytics engine 308 includes an example packet flow path identifier 410, an example packet flow path analyzer 420, an example packet flow path generator 430, an example bandwidth calculator 440, and an example elephant flow detector 450. In addition, the decision engine 310 of the illustrated example includes an example policy adjustor 460 and an example bandwidth analyzer 470.

In the illustrated example of FIG. 4, the telematics agents 306a-c collect information from the ToR switches 110, 112, 116, 118 of FIGS. 1-3 and provide the information to the decision engine 310. In the illustrated example, the telematics agents 306a-c include the packet analyzer 400 to obtain a data packet (e.g., a TCP packet, a VMware vMotion control packet, etc.) from a hardware resource such as the ToR switches 110, 112, 116, 118. In response to obtaining the data packet, the example packet analyzer 400 may compare the data packet to one or more data collection rules to detect a start of a VM migration (e.g., a first virtualized server is preparing to migrate or is migrating to a second virtualized server), to detect a start of a virtualized storage rebalancing, etc. For example, the packet analyzer 400 may detect a signature in the data packet indicative of a vMotion event (e.g., a vMotion start event, a vMotion end event, a vMotion pause event, etc.). In some examples, the telematics agents 306a-c sends the telematics-collected information (e.g., information corresponding to a start of a VM migration, a start of a virtualized storage rebalancing, etc.) to the example decision engine 310 for analysis by the example analytics engine 308. For example, the telematics agents 306a-c may transmit a vMotion control packet (e.g. a vMotion start packet, a vMotion end packet, a vMotion pause packet, etc.) to the analytics engine 308 via the decision engine 310. In some examples, the telematics agents 306a-c determine that an elephant flow has concluded based on detecting a signature in an obtained data packet, analyzing the packet flow rate, etc.

In the illustrated example of FIG. 4, the analytics engine 308 obtains information from the telematics agents 306a-c, the decision engine 310, etc., to identify subsequent responsive action based on telematics-collected information. In the illustrated example, the analytics engine 308 includes the packet flow path identifier 410 to identify an address of a source and a destination for a packet flow. For example, the packet flow path identifier 410 may identify a source address of a source host and a destination address of a destination host for an elephant flow based on an obtained data packet. In another example, the packet flow path identifier 410 may identify a source address of a source host and a destination address of a destination host for a VM migration based on a vMotion control packet. For example, the packet flow path identifier 410 may determine that a vMotion control packet is a vMotion start packet based on a signature included in the vMotion control packet. In response to determining that the vMotion control packet is a vMotion start packet, the example packet flow path identifier 410 may identify an address including an Internet Protocol (IP) address, a port number, etc., of the source host and the destination host. Additionally or alternatively, the example packet flow path identifier 410 may determine any other type of address identification information based on the data packet, the vMotion control packet, etc., such as a media access control (MAC) address or any other type of hardware, network, or software identifier.

In the illustrated example of FIG. 4, the analytics engine 308 includes the packet flow path analyzer 420 to determine whether a vMotion event needs network access (e.g., inter-rackmount communication) to be completed. In some examples, the packet flow path analyzer 420 analyzes the addresses included in a packet header corresponding to the source and the destination hosts included in the vMotion control packet. For example, the packet flow path analyzer 420 may determine that the source host and the destination hosts are in the same rackmount server such as the physical rack 1 102 of FIG. 1 based on an IP address included in the packet header. In such an example or another example, the packet flow path analyzer 420 may map the IP address of the source and the destination hosts to the physical rack 1 102. For example, the packet flow path analyzer 420 may ping the IP address corresponding to the source and the destination hosts to initiate obtaining rackmount server identification information. As a result, the example packet flow path analyzer 420 may determine that a packet flow path corresponding to the vMotion event does not need network access because the packet flow path does not include the spine switches 122 of FIGS. 1-3. For example, the packet flow path analyzer 420 may determine that the flow path is contained within a single physical rack such as the physical rack 1 102, the physical rack 2 104, etc.

In another example, the packet flow path analyzer 420 may determine that the source and the destination hosts are in different rackmount servers. For example, the packet flow path analyzer 420 may determine that the source host is the example server host node(0) 109 in the physical rack 1 102 and the destination host is the example server host node(0) 109 in the physical rack 2 104 based on an IP address included in the packet header. In such an example or another example, the packet flow path analyzer 420 may map an IP address of the source host to the physical rack 1 102 and map an IP address of the destination host to the physical rack 2 104. For example, the packet flow path analyzer 420 may ping the IP addresses corresponding to the source and the destination hosts to initiate obtaining rackmount server identification information. As a result, the example packet flow path analyzer 420 may determine that a packet flow path corresponding to a vMotion event does need network access because the flow path includes the spine switches 122.

In the illustrated example of FIG. 4, the analytics engine 308 includes the packet flow path generator 430 to create a list of network switches which are in a packet flow path between a source host and a destination host. In some examples, the packet flow path generator 430 generates a list of one or more of the ToR switches 110, 112, 116, 118, one or more of the spine switches 122, etc., that can be used to execute a packet flow. For example, the packet flow generator 430 may generate a list of network switches including the ToR switch A 110 of the physical rack 1 102, the ToR switch A 116 of the physical rack 2 104, and the spine switches 122 of FIG. 1 to be used to execute a packet flow such as a VM migration between the source host and the destination host.

In some examples, the packet flow path generator 430 determines a number of data lines connecting the source and the destination hosts. For example, the packet flow path generator 430 may determine that there are five network switches connecting the source and the destination hosts. In such an example, each of the network switches may have eight data lines. As a result, the example packet flow path generator 430 may determine that there are 40 data lines connecting the source and the destination hosts (e.g., 40 data lines=5 network switches×8 data lines per network switch). In some examples, the packet flow path generator 430 determines a data speed, a packet flow rate capacity, etc., of a data line. For example, the packet flow path generator 430 may obtain information corresponding to the data speed of a data line from the telematics agents 306a-c.

In the illustrated example of FIG. 4, the analytics engine 308 includes the bandwidth calculator 440 to calculate a bandwidth based on a packet flow. In some examples, the bandwidth calculator 440 calculates a bandwidth needed to execute the packet flow based on one or more parameters such as a maximum time to complete the packet flow, a minimum packet flow rate, latency of one or more network switches, etc. In some examples, the bandwidth calculator 440 calculates a number of data lines needed to execute the packet flow based on the calculated bandwidth. As used herein, the term "data line" refers to a packet flow through an individual port of a network switch (e.g., network switch ports). For example, the ToR switch 110 may include 1024 data lines per network interface corresponding to port numbers 0-1023 for a specified subnet.

In some examples, the bandwidth calculator 440 determines a size of a packet flow. For example, the bandwidth calculator 440 may determine a size of a VM migration based on information included in a data packet (e.g., information included in a packet header of a vMotion control packet, a network packet, etc.). In some examples, the bandwidth calculator 440 calculates a number of data lines to execute a packet flow based on a data speed of the data lines and the packet flow size. For example, the bandwidth calculator 440 may determine that a packet flow path for a VM migration with a packet flow size of 180 Gb includes the ToR switch A 110 of the physical rack 1 102, one of the spine switches 122, and the ToR switch A 116 of the physical rack 2 104. The example bandwidth calculator 440 may determine that each of the switches includes 10 data lines where each data line has a data speed of 10 Gbps for a total of 30 data lines and 300 Gbps total bandwidth. In such an example, the bandwidth calculator 440 may calculate that 18 data lines can be used to execute the VM migration based on the data speed of 10 Gbps of each of the 30 data lines and a packet flow size of 180 Gb (e.g., 18 data lines=180 Gb÷10 Gbps per data line). In response to determining that 18 out of the 30 data lines can be used to execute the VM migration, the remaining 12 data lines may be used to redistribute existing packet flows.

In some examples, the bandwidth calculator 440 determines whether a calculated number of data lines exceeds a data line threshold. For example, the bandwidth calculator 440 may ensure that no more than half of available data lines are used to execute a packet flow. In such an example or another example, the bandwidth calculator 440 may determine that the data line threshold is five data lines based on the bandwidth calculator 440 determining that there are 10 total available data lines (e.g., 5 data lines=10 total available data lines×0.5). Alternatively, the data line threshold may use any other number of data lines for the data line threshold. In some examples, the bandwidth calculator 440 reduces the calculated number of data lines to prevent the calculated number of data lines from exceeding the data line threshold. For example, the bandwidth calculator 440 may reduce a calculated number of five data lines to four data lines to ensure that the number of data lines used to execute the packet flow does not exceed a data line threshold of four data lines.

In the illustrated example of FIG. 4, the analytics engine 308 includes the elephant flow detector 450 to determine whether a packet flow can be identified as an elephant flow. In an example computer network, a small number of packet flows may carry a majority of network traffic while a large number of packet flows may carry a minority of network traffic. For example, a significantly large continuous packet flow such as media streaming (e.g., online streaming of music, movies, television, etc.) may congest a computer network where a large number of significantly smaller packet flows may not be transmitted or executed as expected due to the congestion. In some examples, the elephant flow detector 450 identifies a packet flow as an elephant flow based on a packet flow rate. For example, the elephant flow detector 450 may determine that a packet flow has a packet flow rate of one Gbps. In such an example, the elephant flow detector 450 may determine the packet flow rate based on information collected from the telematics agents 306a-c.

In some examples, the elephant flow detector 450 identifies a packet flow as an elephant flow based on a number of transmitted data packets compared to a number of received acknowledgment data packets. For example, a source host may transmit a data packet to a destination host. In response to the destination host receiving the transmitted data packet, the destination host may transmit an acknowledgment packet to the source host indicating that the destination host received the transmitted data packet. In some examples, the elephant flow detector 450 calculates a difference between a number of transmitted data packets and a number of received acknowledgment data packets, compares the difference to an elephant flow detection threshold, and determine whether the difference satisfies the elephant flow detection threshold (e.g., a difference greater than 100,000 data packets, 200,000 data packets, etc.). For example, the elephant flow detector 450 may identify a packet flow as an elephant flow based on a difference of 150,000 data packets being greater than an elephant flow detection threshold of 100,000 data packets.

In some examples, the elephant flow detector 450 determines whether the elephant flow can be optimized based on the difference satisfying an elephant flow optimization threshold. For example, the elephant flow detector 450 may determine that the elephant flow can be optimized based on the difference being greater than 10,000 data packets, 20,000 data packets, etc. In another example, the elephant flow detector 450 may determine that the elephant flow cannot be optimized based on the difference being less than 10,000 data packets, 20,000 data packets, etc. For example, the elephant flow detector 450 may determine that an elephant flow may be optimized based on the difference of 15,000 data packets being greater than the elephant flow optimization threshold of 10,000 data packets.

In the illustrated example of FIG. 4, the decision engine 310 runs on a VM and is provided to make decisions based on analyses of the telematics-collected information obtained from the telematics agents 306a-c and/or the telematics agent 306d of FIG. 3. In the illustrated example, the decision engine 310 includes the policy adjustor 460 to adjust one or more packet flow policies of a network switch to improve a parameter of a packet flow such as a time to completion, a packet flow rate, etc. In some examples, the policy adjustor 460 adjusts one or more QoS parameters included in one or more QoS policies on a network switch to prioritize a packet flow, assign a bandwidth to the packet flow, etc. For example, the policy adjustor 460 may direct the resource config agents 312a-c of FIG. 3 to adjust a QoS parameter, a QoS policy, etc., of the ToR switches 110, 112, 116, 118, the spine switches 122, etc., to prioritize a packet flow corresponding to a VM migration, an elephant flow, etc. In some examples, the policy adjustor 460 selects a network switch to process. In some examples, the policy adjustor 460 determines whether there is another network switch to process. For example, the policy adjustor 460 may determine that there are 10 network switches to process. In such an example, the policy adjustor 460 may determine that there are six network switches that have yet to be processed based on processing the first four of the 10 network switches.

In some examples, the policy adjustor 460 determines whether an equal-cost multi-path (ECMP) routing hash policy is utilized. For example, the policy adjustor 460 may obtain information from the telematics agents 306a-c indicating that one or more ECMP routing hash policies are utilized such as a level two (L2) or a level three (L3) ECMP routing hash policy. In some examples, the policy adjustor 460 adjusts an ECMP routing hash policy of a network switch to allocate a packet flow to one or more data lines of one or more network switches. For example, the policy adjustor 460 may adjust an ECMP routing hash policy to allocate a packet flow to a first and a second network switch port of a network switch. In some examples, the policy adjustor 460 adjusts the ECMP routing hash policy by adjusting one or more parameters corresponding to a hash algorithm included in the ECMP routing hash policy. For example, the policy adjustor 460 may direct the resource config agents 312a-c to adjust a hash algorithm to redistribute existing packet flows and available data links to prioritize a packet flow corresponding to a VM migration, an elephant flow, etc. In some examples, the policy adjustor 460 selects a network switch to process for policy adjustment. In some examples, the policy adjustor 460 determines whether there is another network switch to process. For example, the policy adjustor 460 may process (e.g., iteratively process) network switches in a packet flow path starting from a source host to a destination host. In such an example, the policy adjustor 460 may determine that there is not another network switch to process when all of the network switches between the source host and the destination host have been processed.

In the illustrated example of FIG. 4, the decision engine 310 includes the bandwidth analyzer 470 to determine whether a packet flow path can be optimized based on bandwidth. In some examples, the bandwidth analyzer 470 determines whether to add or delete a network switch to a packet flow path (e.g., a list of network switches generated by the packet flow path generator 430). For example, the bandwidth analyzer 470 may compare a used bandwidth corresponding to a packet flow, compare the used bandwidth to a total bandwidth of all network switches in the packet flow path (e.g., a sum of available bandwidth and used bandwidth for all network switches in the packet flow path), and determine whether the used bandwidth satisfies a bandwidth threshold (e.g., the used bandwidth is greater than 70%, 80%, 90%, etc., of the total bandwidth). In such an example, the bandwidth analyzer 470 may direct the packet flow path generator 430 to add a network switch based on the used bandwidth of the packet flow being greater than 90% of the total bandwidth.

In some examples, the bandwidth analyzer 470 determines whether to dynamically add or delete a network switch to a packet flow path. For example, during an execution of a packet flow, the bandwidth analyzer 470 may dynamically compare a bandwidth to a packet flow, compare the bandwidth to a total bandwidth of all network switches in the packet flow path, and determine whether the bandwidth satisfies a bandwidth threshold. In such examples, the bandwidth threshold may be dynamically adjusted during the execution of the packet flow. For example, the packet flow path generator 430 may add a network switch based on the used bandwidth of the packet flow during execution being greater than 95% of the total bandwidth.

In some examples, the bandwidth analyzer 470 determines whether to optimize a packet flow path for an elephant flow. For example, the bandwidth analyzer 470 may compare a used bandwidth corresponding to an elephant flow, compare the used bandwidth to a total bandwidth of all network switches in the packet flow path for the elephant flow, and determine whether the used bandwidth satisfies an elephant flow bandwidth threshold (e.g., the used bandwidth is greater than 70%, 80%, 90%, etc., of the total bandwidth). In another example, the bandwidth analyzer 470 may analyze a difference between a number of transmitted data packets and a number of acknowledgment data packets as calculated by the elephant flow detector 450. For example, the bandwidth analyzer 470 may compare the difference to an elephant flow optimization threshold, and determine whether the difference satisfies the elephant flow optimization threshold (e.g., the difference is greater than 100,000 packets, 200,000 packets, etc.). In such an example, the bandwidth analyzer 470 may determine that a packet flow path can be optimized based on the difference between the number of transmitted data packets and a number of acknowledgment packets being greater than 100,000 data packets.

While an example manner of implementing the example telematics agents 306a-c, the example analytics engine 308, and the example decision engine 310 of FIG. 3 is illustrated in FIG. 4, one or more of the elements, processes and/or devices illustrated in FIG. 4 may be combined, divided, re-arranged, omitted, eliminated and/or implemented in any other way. Further, the example packet analyzer 400, the example packet flow path identifier 410, the example packet flow path analyzer 420, the example packet flow path generator 430, the example bandwidth calculator 440, the example elephant flow detector 450, the example policy adjustor 460, the example bandwidth analyzer 470 and/or, more generally, the example telematics agents 306a-c, the example analytics engine 308, and the example decision engine 310 of FIG. 3 may be implemented by hardware, software, firmware and/or any combination of hardware, software and/or firmware. Thus, for example, any of the example packet analyzer 400, the example packet flow path identifier 410, the example packet flow path analyzer 420, the example packet flow path generator 430, the example bandwidth calculator 440, the example elephant flow detector 450, the example policy adjustor 460, the example bandwidth analyzer 470 and/or, more generally, the example telematics agents 306a-c, the example analytics engine 308, and the example decision engine 310 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example packet analyzer 400, the example packet flow path identifier 410, the example packet flow path analyzer 420, the example packet flow path generator 430, the example bandwidth calculator 440, the example elephant flow detector 450, the example policy adjustor 460, and/or the example bandwidth analyzer 470 is/are hereby expressly defined to include a non-transitory computer readable storage device or storage disk such as a memory, a digital versatile disk (DVD), a compact disk (CD), a Blu-ray disk, etc. including the software and/or firmware. Further still, the example telematics agents 306a-c, the example analytics engine 308, and the example decision engine 310 of FIG. 3 may include one or more elements, processes and/or devices in addition to, or instead of, those illustrated in FIG. 4, and/or may include more than one of any or all of the illustrated elements, processes and devices.

Flowcharts representative of example machine readable instructions for implementing the example telematics agents 306a-c, the example analytics engine 308, and/or the example decision engine 310 of FIGS. 3-4 are shown in FIGS. 5-9. In these examples, the machine readable instructions comprise a program for execution by one or more processors such as the processor 1212 shown in the example processor platform 1200 discussed below in connection with FIG. 12. The program may be embodied in software stored on a non-transitory computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 5-9, many other methods of implementing the example the example telematics agents 306a-c, the example analytics engine 308, and the example decision engine 310 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 5:
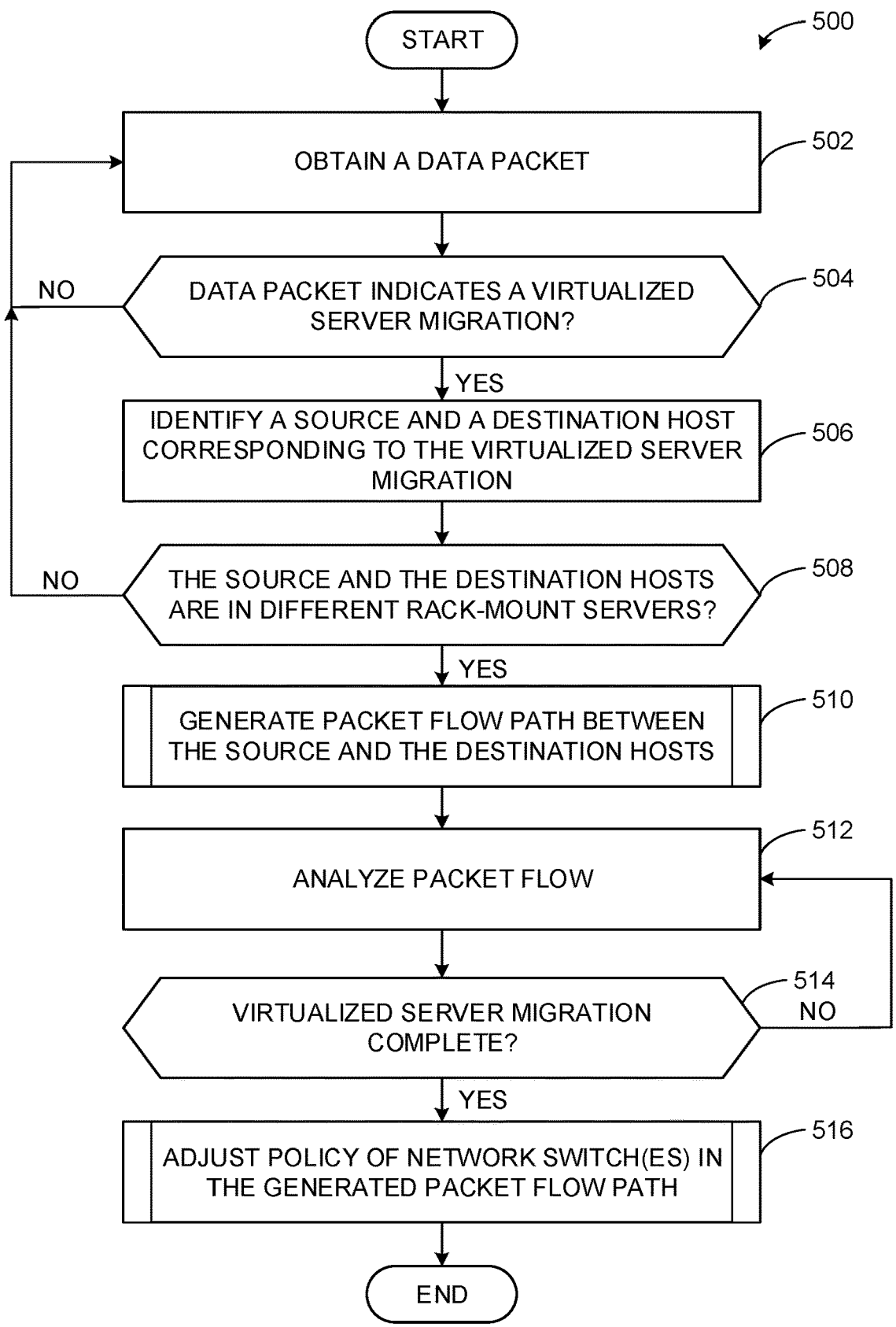
FIGS. 5-6 are flow diagrams representative of example computer readable instructions that may be executed to implement the example telematics agents, the example analytics engine, and/or the example decision engine of FIGS. 3-4 that may be used to implement the examples disclosed herein.

FIG. 5 is a flowchart representative of an example method 500 that may be performed by the example telematics agents 306a-c, the example analytics engine 308, and the decision engine 310 of FIGS. 3-4 to optimize packet flow among virtualized servers. The example method 500 begins at block 502 when the telematics agent 306a-c obtains a data packet. For example, the packet analyzer 400 may obtain a vMotion control packet from one of the ToR switches 110, 112, 116, 118 of FIGS. 1-3.

At block 504, the example telematics agent 306a-c determines whether the data packet indicates a virtualized server migration. For example, the packet analyzer 400 may detect a signature in the vMotion control packet indicative of a vMotion start event to execute a migration from a first virtualized server (e.g., the example server host node(0) 109 in the physical rack 1 102) to a second virtualized server (e.g., the example server host node(0) 109 in the physical rack 2 104).

If, at block 504, the example telematics agent 306a-c does not determine that the data packet indicates a virtualized server migration, control returns to block 502 to obtain another data packet. If, at block 504, the example telematics agent 306a-c determines that the data packet indicates a virtualized server migration, then, at block 506, the example analytics engine 308 identifies a source and a destination host corresponding to the virtualized server migration. For example, the packet flow path identifier 410 may identify a source host to be in the server host node(0) 109 in the physical rack 1 102 based on information included in the vMotion control packet (e.g., an IP address, a MAC address, etc.). In such an example, the packet flow path identifier 410 may identify a destination host to be in the server host node(0) 109 in the physical rack 2 104 based on the information included in the vMotion control packet.

At block 508, the example analytics engine 308 determines whether the source and the destination hosts are in different rackmount servers. For example, the packet flow path analyzer 420 may determine that the source host in the server host node(0) 109 in the physical rack 1 102 is in a different rack mount server than the destination host in the server host node(0) 109 in the physical rack 2 104. In another example, the packet flow path analyzer 420 may determine that the source and the destination hosts are in the physical rack 1 102.

If, at block 508, the example analytics engine 308 determines that the source and the destination hosts are not in different rackmount servers, control returns to block 502 to obtain another data packet. If, at block 508, the example analytics engine 308 determines that the source and the destination hosts are in different rackmount servers, then, at block 510, the analytics engine 308 generates a packet flow path between the source and the destination hosts. For example, the packet flow path generator 430 may generate a list of network switches between the source and the destination hosts. An example process that may be used to implement block 510 is described below in connection with FIG. 6.

At block 512, the telematics agents 306a-c analyzes a packet flow. For example, the packet analyzer 400 may analyze, inspect, etc., a packet header of a data packet included in the VM migration. At block 514, the example telematics agents 306a-c determine whether the virtualized server migration is complete. For example, the packet analyzer 400 may determine that the virtualized server migration is complete based on information included in a data packet obtained during the packet flow. For example, the packet analyzer 400 may detect a signature in a data packet such as a vMotion control packet indicative of a vMotion end event indicating that the migration from the first virtualized server to the second virtualized server is complete.

If, at block 514, the example telematics agents 306a-c determine that the virtualized server migration is not complete, control returns to block 512 to continue analyzing the packet flow. If, at block 514, the example telematics agents 306a-c determine that the virtualized server migration is complete, then, at block 516, the example decision engine 310 adjusts a policy of network switch(es) in the generated packet flow path. For example, the policy adjustor 460 may adjust a QoS policy, an ECMP routing hash policy, etc., of a network switch in the generated flow path.

Figure 6:
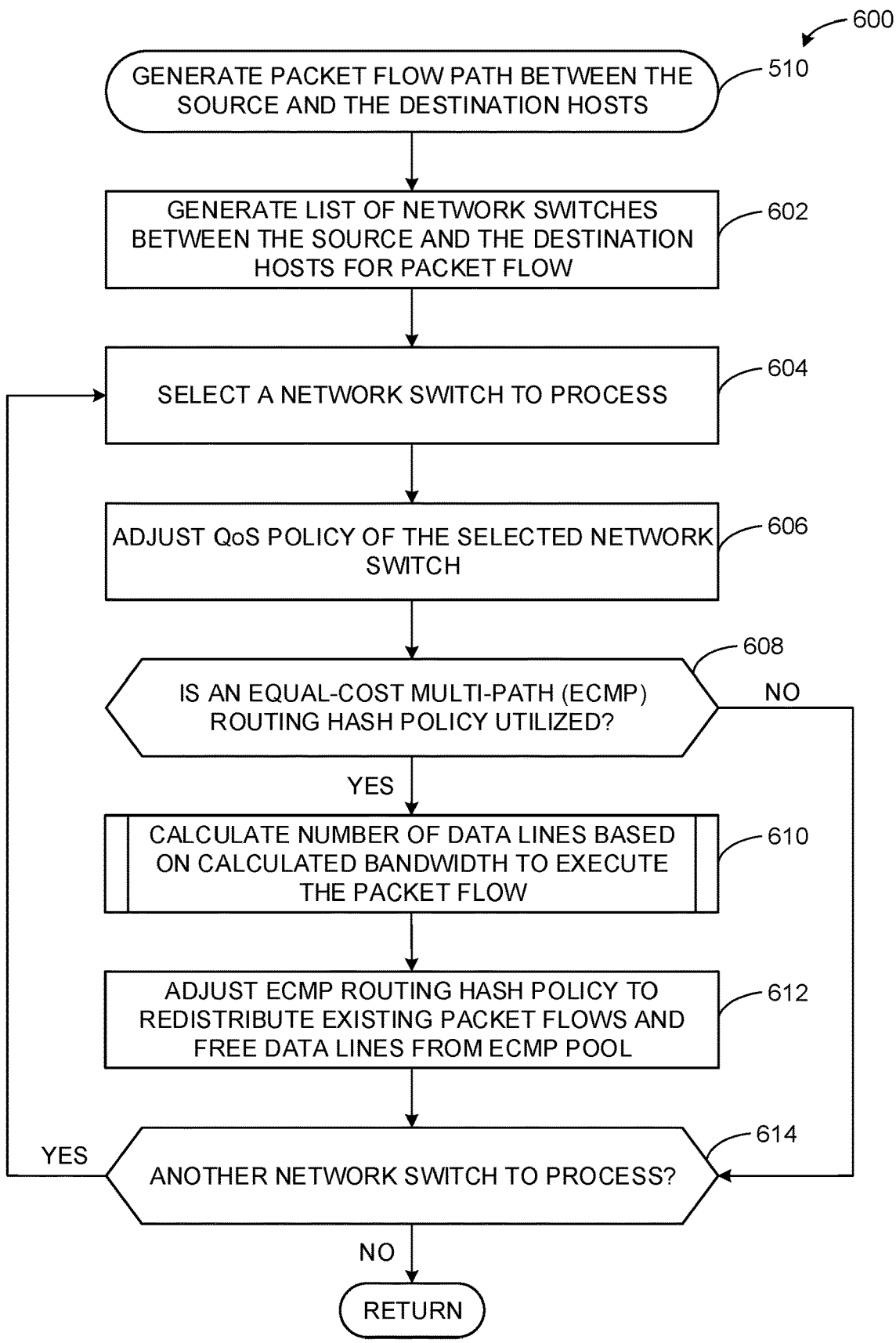

FIG. 6 is a flowchart representative of an example method 600 that may be performed by the example telematics agents 306a-c, the example analytics engine 308, and the example decision engine 310 to generate a packet flow path between a source and a destination host. The example process of FIG. 6 may be used to implement the operation of block 510 of FIG. 5.

The example method 600 begins at block 602 when the example analytics engine 308 generates a list of network switches between the source and the destination hosts. For example, the packet flow path generator 430 may generate a list of five network switches between (1) a source host in the server host node(0) 109 in the physical rack 1 102 and (2) a destination host in the server host node(0) 109 in the physical rack 2 104 to execute a packet flow corresponding to a VM migration, an elephant flow, etc.

At block 604, the example decision engine 310 selects a network switch to process. For example, the policy adjustor 460 may select the ToR switch A 110 of the first physical rack 1 102 to process. At block 606, the example decision engine 310 adjusts a QoS policy of the selected network switch. For example, the policy adjustor 460 may adjust a QoS policy of the ToR switch A 110 of the first physical rack 1 102 to prioritize the packet flow.

At block 608, the example telematics agent 306a-c determine whether an ECMP routing hash policy is utilized. For example, the packet analyzer 400 may obtain information from the ToR switch A 110 included in the physical rack 1 102 indicating that the ToR switch A 110 is using an ECMP routing hash policy.

If, at block 608, the example telematics agent 306a-c determines that an ECMP routing hash policy is not used, control proceeds to block 614 to determine whether there is another network switch to process. If, at block 608, the example telematics agent 306a-c determines that an ECMP routing hash policy is used, then, at block 610, the example analytics engine 308 calculates a number of data lines based on a calculated bandwidth to execute the packet flow. For example, the bandwidth calculator 440 may calculate a number of data lines to be used to execute the packet flow based on the calculated bandwidth. An example process that may be used to implement block 610 is described below in connection with FIG. 7.

At block 612, the example decision engine 310 adjusts an ECMP routing hash policy to redistribute existing packet flows and free data lines from an ECMP pool. For example, the policy adjustor 460 may direct one or more of the resource config agents 312a-c to adjust a parameter of a hash algorithm included in the ECMP routing hash policy of the network switches included in the generated list.

At block 614, the example decision engine 310 determines whether there is another network switch to process. For example, the policy adjustor 460 may determine that the ToR switch B 112 of the physical rack 1 102, one or more of the spine switches 122, etc., have not yet been processed. If, at block 614, the example decision engine 310 determines that there is another network switch to process, control returns to block 604 to select another network switch to process, otherwise the example method 600 concludes.

Figure 7:
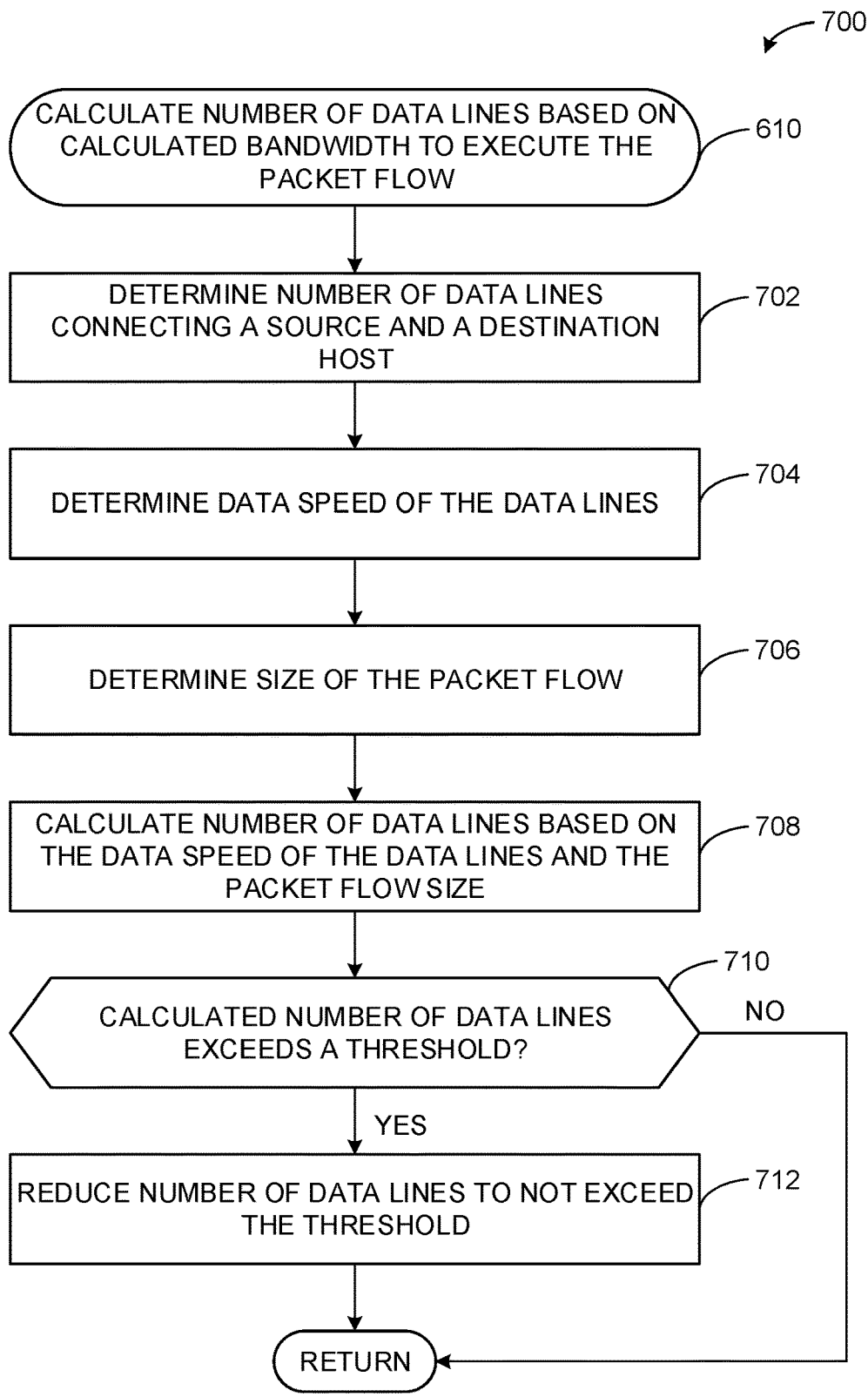
FIG. 7 is a flow diagram representative of example computer readable instructions that may be executed to implement the example analytics engine of FIGS. 3-4 that may be used to implement the examples disclosed herein.

FIG. 7 is a flowchart representative of an example method 700 that may be performed by the example analytics engine 308 of FIGS. 3-4 to calculate a number of data lines based on a calculated bandwidth to execute the packet flow. The example process of FIG. 7 may be used to implement the operation of block 610 of FIG. 6. The example method 700 begins at block 702 when the example analytics engine 308 determines a number of data lines connecting a source and a destination host. For example, the packet flow path generator 430 may determine that there are 10 data lines between (1) a source host in the server host node(0) 109 in the physical rack 1 102 and (2) a destination host in the server host node(0) 109 in the physical rack 2 104 to execute a packet flow corresponding to a VM migration, an elephant flow, etc.

At block 704, the example analytics engine 308 determines a data speed of the data lines. For example, the packet flow path generator 430 may determine a data speed of each of the data lines connecting the source and the destination hosts. In such an example, the packet flow path generator 430 may determine that each of the data lines can execute the packet flow (e.g., transmit and/or receive one or more data packets included in the packet flow) at a packet flow rate of 10 Gbps.

At block 706, the example analytics engine 308 determines a size of the packet flow. For example, the bandwidth calculator 440 may determine that the size of the packet flow corresponding to the VM migration is 40 Gb.

At block 708, the example analytics engine 308 calculates a number of data lines based on the data speed of the data lines and the packet flow size. For example, the bandwidth calculator 440 may calculate that four data lines can be used to execute the packet flow size (e.g., 6 data lines=60 Gb÷10 Gbps per data line).

At block 710, the example analytics engine 308 determines whether a number of calculated data lines exceeds a threshold. For example, the bandwidth calculator 440 may determine that a data line threshold to execute the packet flow is half of the total number of data lines between the source and the destination hosts. In such an example or another example, the bandwidth calculator 440 may determine that the data line threshold is five data lines (e.g., 10 total data lines×0.5=5 data lines). As a result, the bandwidth calculator 440 may determine that the six calculated data lines exceeds the data line threshold of five data lines.

If, at block 710, the example analytics engine 308 determines that the number of calculated data lines exceeds a threshold, then, at block 712, the analytics engine 308 reduces a number of data lines to not exceed the threshold. For example, the bandwidth calculator 440 may reduce the six calculated data lines to five or fewer data lines. If, at block 710, the example analytics engine 308 determines that the number of calculated data lines does not exceed a threshold, then the example method 700 concludes.

Figure 8:
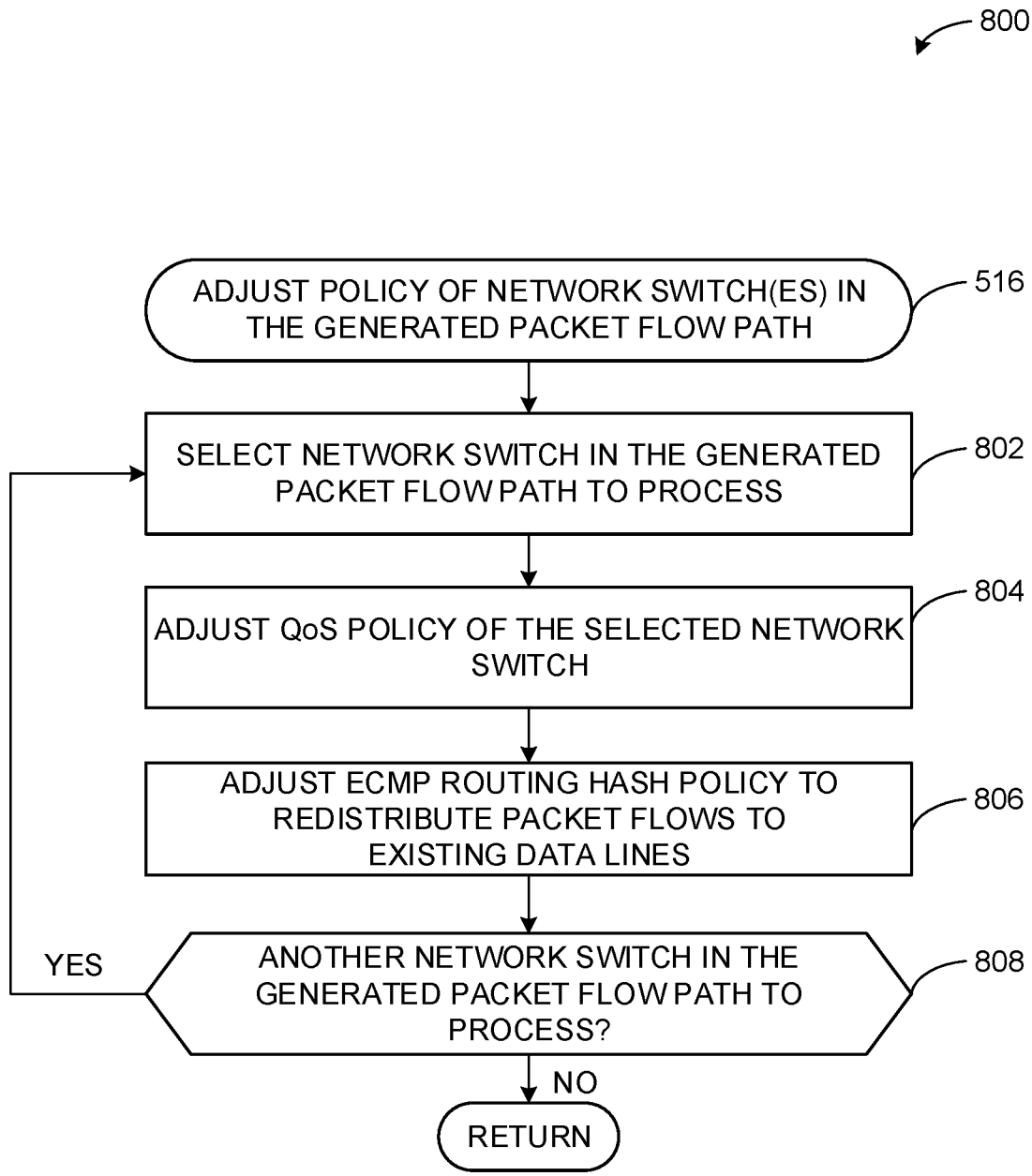
FIG. 8 is a flow diagram representative of example computer readable instructions that may be executed to implement the example decision engine of FIGS. 3-4 that may be used to implement the examples disclosed herein.

FIG. 8 is a flowchart representative of an example method 800 that may be performed by the example decision engine 310 to adjust a policy of network switch(es) in the generated packet flow path. The example process of FIG. 8 may be used to implement the operation of block 516 of FIG. 5. The example method 800 begins at block 802 when the example decision engine 310 selects a network switch in the generated packet flow path to process. For example, the policy adjustor 460 may select a network switch in the generated flow path to process.

At block 804, the example decision engine 310 adjusts a QoS policy of the selected network switch. For example, the policy adjustor 460 may direct one or more of the resource config agents 312*a-c* of FIG. 3 to restore a current QoS policy of the selected network switch to a previous QoS policy, where the previous QoS policy operated prior to the packet flow (e.g., prior to the VM migration, the elephant flow, etc.).

At block 806, the example decision engine 310 adjusts an ECMP routing hash policy to redistribute packet flows to existing data lines. For example, the policy adjustor 460 may direct one or more of the resource config agents 312*a-c* to adjust a parameter of an ECMP hash algorithm to redistribute current and subsequent packet flows to existing data lines.

At block 808, the example decision engine 310 determines whether there is another network switch in the generated flow path to process. For example, the policy adjustor 460 may determine that there is another network switch in the generated flow path to process. If, at block 808, the example decision engine 310 determines that there is another network switch in the generated flow path to process, control returns to block 802 to select another network switch in the generated packet flow path to process, otherwise the example method 800 concludes.

Figure 9:
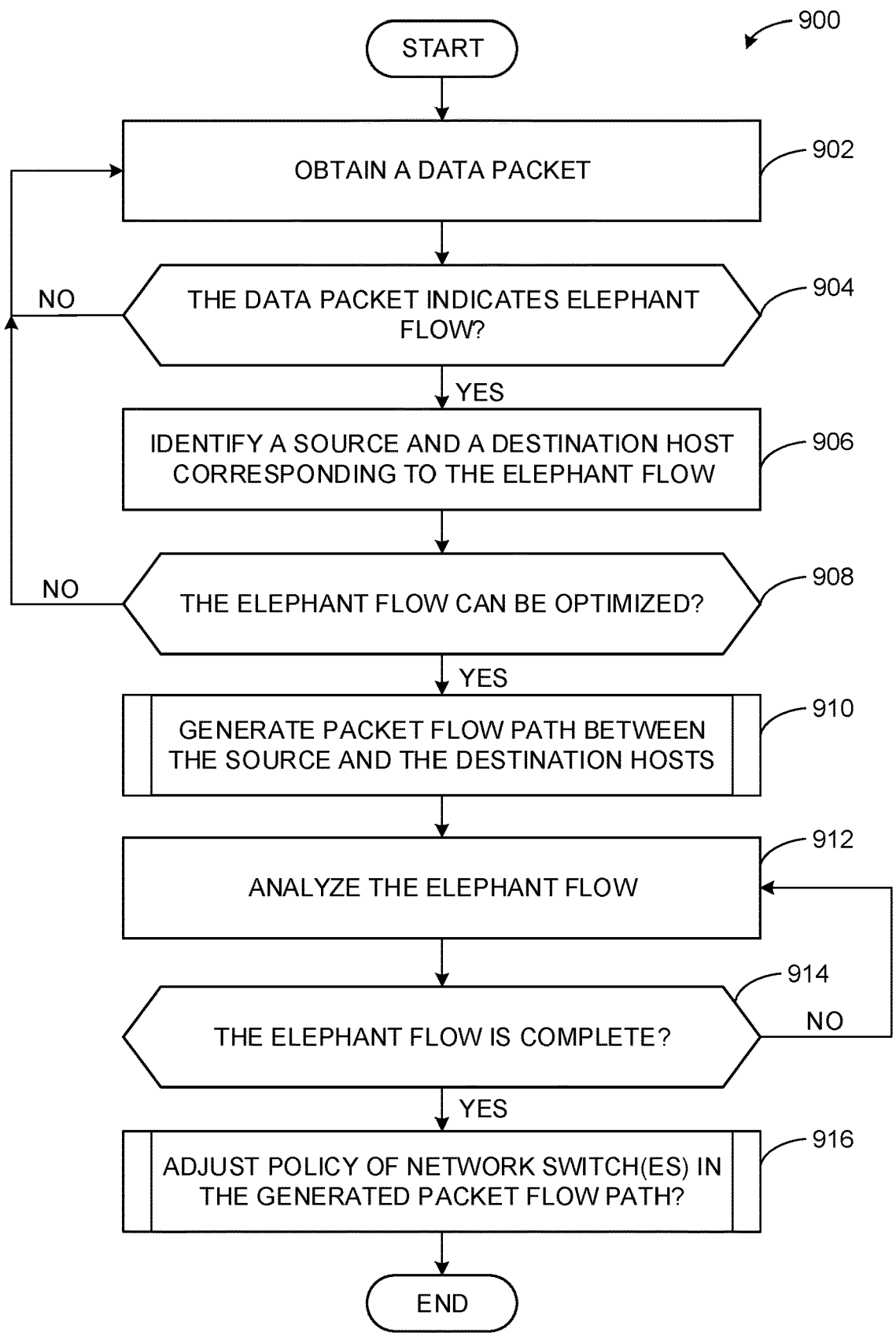
FIG. 9 is a flow diagram representative of example computer readable instructions that may be executed to implement the example telematics agents, the example analytics engine, and the example decision engine of FIGS. 3-4 that may be used to implement the examples disclosed herein.

FIG. 9 is a flowchart representative of an example method 900 that may be performed by the example telematics agents 306*a-c*, the example analytics engine 308, and the example decision engine 310 to optimize an elephant flow among virtualized servers. The example method 900 begins at block 902 when the example telematics agent 306*a-c* obtains a data packet. For example, the packet analyzer 400 may obtain a data packet from one of the ToR switches 110, 112, 116, 118 of FIGS. 1-3.

At block 904, the example analytics engine 308 determines whether the data packet indicates an elephant flow. For example, the elephant flow detector 450 may determine that a packet flow has a packet flow rate of one Gbps. In such an example, the elephant flow detector 450 may determine that the packet flow is an elephant flow based on the packet flow rate.

If, at block 904, the example analytics engine 308 determines that the data packet does not indicate an elephant flow, control returns to block 902 to obtain another data packet. If, at block 904, the example analytics engine 308 determines that the data packet does indicate an elephant flow, then, at block 906, the analytics engine 308 identifies a source and a destination host corresponding to the elephant flow. For example, the packet flow path identifier 410 may identify a source host to be the server host node(0) 109 in the physical rack 1 102 based on information included in the data packet (e.g., an IP address, a MAC address, etc.). In such an example, the packet flow path identifier 410 may identify a destination host to be the server host node(0) 109 in the physical rack 2 104 based on the information included in the data packet.

At block 908, the example analytics engine 308 determines whether the elephant flow can be optimized. For example, the elephant flow detector 450 may calculate a difference between a number of transmitted data packets and a number of received acknowledgement packets. In such an example, the elephant flow detector 450 may compare the difference to an elephant flow optimization threshold and determine whether the difference satisfies the elephant flow optimization threshold. For example, the elephant flow detector 450 may determine that the elephant flow can be optimized based on the difference being greater than the elephant flow optimization threshold of 10,000 data packets.

If, at block 908, the example analytics engine 308 determines that the elephant flow cannot be optimized, control returns to block 902 to obtain another data packet. If, at block 908, the example analytics engine 308 determines that the elephant flow can be optimized, then, at block 910, the analytics engine 308 generates a packet flow path between the source and the destination hosts. For example, the telematics agents 306*a-c*, the analytics engine 308, and the decision engine 310 may execute the example method 600 of FIG. 6 to generate the packet flow path of the elephant flow between the source and the destination hosts. At block 912, the example decision engine 310 analyzes the elephant flow. For example, the telematics agents 306*a-c* may determine that the elephant flow is complete based on a packet header, a packet flow rate, etc.

At block 914, the example telematics agent 306*a-c* determines whether the elephant flow is complete. For example, the packet analyzer 400 may detect a signature in an obtained data packet indicating that the elephant flow is complete. If, at block 914, the example telematics agent 306*a-c* determines that the elephant flow is not complete, control returns to block 912 to continue analyzing the elephant flow. If, at block 914, the example telematics agent 306*a-c* determines that the elephant flow is complete, then, at block 916, the decision engine 310 adjusts a policy of network switch(es) in the generated packet flow path. For example, the decision engine 310 may execute the example method 800 of FIG. 8 to adjust a configuration of a current QoS policy, a current ECMP routing hash policy, etc., of a network switch to a previous configuration, where the previous configuration operated prior to the elephant flow. In response to adjusting the policy of the network switch(es) in the generated packet flow path, the example method 900 concludes.

FIG. 10 depicts example source code 1000 representative of example computer readable instructions that may be executed to implement the example analytics engine and/or the example decision engine of FIGS. 3-4 to adjust a policy of one or more network switches in a flow path between a source and a destination host to execute a VM migration. Alternatively, the example source code 1000 may be used to adjust a policy of one or more network switches in a flow path between a source and a destination host to execute an elephant flow. In the illustrated example, the analytics engine 308 obtains the set of all ToR and spine switches in a packet flow path to be used to execute the VM migration. For example, the packet flow path generator 430 may generate the set of network switches. In response to generating the set, the example decision engine 310 may select a network switch to process. For example, the policy adjustor

460 may select the ToR switch A 110 of the physical rack 1 102 to process. In response to selecting the network switch to process, the example decision engine 310 may direct a QoS policy of the selected network switch to be adjusted. For example, the policy adjustor 460 may direct one or more of the resource config agents 312a-c to adjust a QoS policy of the selected network switch.

In response to adjusting the QoS policy for the selected network switch, the example decision engine 310 determines whether there is level two (L2) or level three (L3) ECMP routing hash policy being utilized for the selected network switch. For example, the policy adjustor 460 may determine that the ToR switch A 110 of the physical rack 1 102 utilizes a L2 ECMP routing hash policy. If, the example decision engine 310 determines that the selected network switch utilizes L2 or L3 ECMP routing hash policy, then the analytics engine 308 calculates a packet flow bandwidth. For example, the bandwidth calculator 440 may calculate a bandwidth for the VM migration.

In response to calculating the bandwidth for the packet flow, the example decision engine 310 migrates existing packet flows and frees up one or more data lines to execute the packet flow. For example, the policy adjustor 460 may allocate a first set of data lines for existing packet flows and allocate a second set of data lines for the VM migration (e.g., to prioritize the VM migration compared to the existing packet flows). In response to migrating the existing packet flows and freeing up the one or more data lines, the example decision engine 310 adjusts an ECMP hash routing policy of the selected network switch so that the packet flow corresponding to the VM migration uses the one or more free data lines. For example, the policy adjustor 460 may direct one or more of the resource config agents 312a-c to adjust the ECMP hash routing policy of the selected network switch to assign the VM migration to the one or more free data lines.

In response to adjusting the ECMP routing hash policy of the selected network switch, the example decision engine 310 determines whether there is another network switch to process. For example, the policy adjustor 460 may determine that there is another network switch to process and continues to execute the source code 1000 until there are no remaining network switches to process. When there are no remaining network switches to process, the example source code 1000 concludes.

FIG. 11 depicts example source code 1100 representative of example computer readable instructions that may be executed to implement the example analytics engine and/or the example decision engine of FIGS. 3-4 that may be used to implement the examples disclosed herein. In the illustrated example, the analytics engine 308 determines a number of ECMP data lines between two network switches (e.g., a number of data lines between a source and a destination host), a speed of each data line (e.g., a packet flow rate capability of each data line), and a size of a packet flow such as a VM migration via vMotion, an elephant flow, etc.

In the illustrated example, the analytics engine 308 calculates a number of data lines needed to execute a packet flow. For example, the bandwidth calculator 440 may calculate the number of data lines based on a ratio of the packet flow size with respect to the speed of the data lines. The example analytics engine 308 determines whether the number of calculated data lines is greater than a data line threshold. In the illustrated example, the bandwidth calculator 440 calculates the data line threshold by halving the number of ECMP data lines. Alternatively, the bandwidth calculator 440 may calculate the data line threshold by dividing the number of ECMP data lines by any other number. If, the example analytics engine 308 determines that the number of the calculated data lines is greater than the data line threshold, then the number of calculated data lines is reduced to the data line threshold, otherwise the example source code 1100 concludes.

Figure 12:
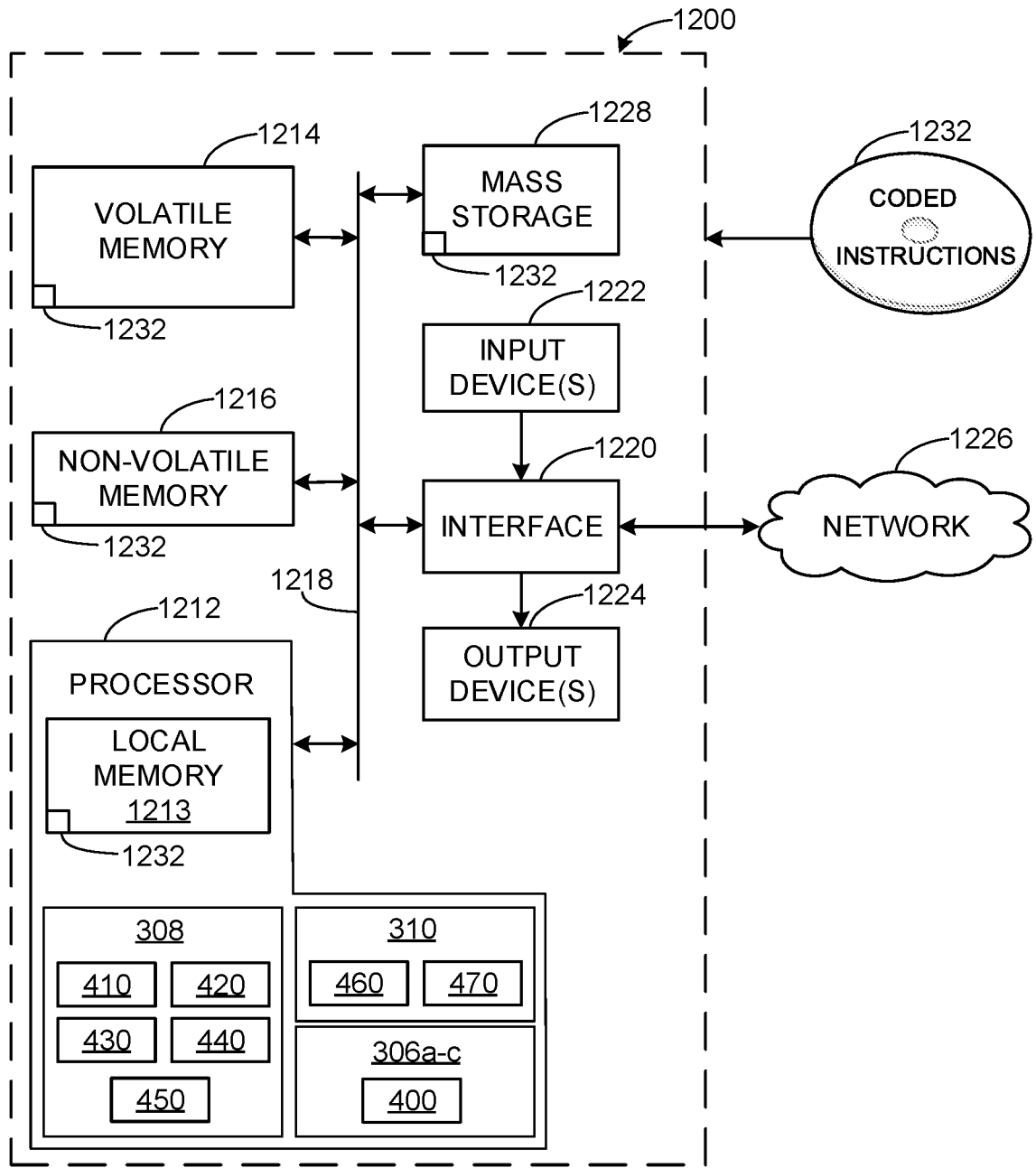
FIG. 12 is an example processor platform capable of executing the example computer readable instructions represented by FIGS. 5-11 to implement the example telematics agents, the example analytics engine, and/or the example decision engine of FIGS. 3-4 to optimize packet flow among virtualized servers in accordance with the teachings of this disclosure.

FIG. 12 is a block diagram of an example processor platform 1200 capable of executing the instructions of FIGS. 5-11 to implement the telematics agents 306a-c, the analytics engine 308, and the decision engine 310 of FIGS. 3-4. The processor platform 1200 can be, for example, a rack-mount server or any other type of computing device.

The processor platform 1200 of the illustrated example includes a processor 1212. The processor 1212 may include one or more processors. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor 1212 implements the example packet analyzer 400, the example packet flow path identifier 412, the example packet flow path analyzer 420, the example packet flow path generator 430, the example bandwidth calculator 440, the example elephant flow detector 450, the example policy adjustor 460, the example bandwidth analyzer 470 and/or, more generally, the example telematics agents 306a-c, the example analytics engine 308, and the example decision engine 312.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 5-11 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus, systems, and articles of manufacture have been disclosed that optimize a packet flow between a source and a destination host based on a detection of a temporary event such as a VM migration, an elephant flow, etc. Examples disclosed herein adjust the packet flow based on generating a packet flow path between the source host and the destination host. Examples disclosed herein describe modifying a policy of a network switch such as a QoS policy, an ECMP hash routing policy, etc., to prioritize the transmission of the packet flow. In addition, examples disclosed herein describe dynamically expanding or contracting the packet flow path based on calculating a bandwidth of the packet flow. As a result, examples disclosed herein improve routing hardware used to execute the packet flow when responding to the temporary event while avoiding a disruption of existing packet flows. The routing hardware can be improved by executing an increasing number of packet flows as compared to prior systems where the temporary event congested existing packet flow paths preventing existing packet flows from being executed.

Although certain example methods, apparatus, systems, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a packet analyzer to determine that a first virtualized server is preparing to migrate to a second virtualized server based on a data packet;
    a packet flow path generator to identify a set of network switches between the first virtualized server and the second virtualized server when the first virtualized server is in a different rackmount server than the second virtualized server;
    a bandwidth calculator to:
        determine a first number of data lines to execute a packet flow corresponding to the migration based on a packet flow size of the packet flow and data speeds associated with the first number of data lines, the first number of data lines associated with the set of network switches; and
        reduce the first number of data lines to a second number of data lines when the first number of data lines exceeds a threshold, the second number of data lines to not exceed the threshold; and
    a policy adjustor to adjust a policy of one or more network switches in the set to prioritize the packet flow by executing the packet flow with the second number of data lines.

2. The apparatus of claim 1, wherein the packet flow path generator is to identify the set of network switches based on a source address and a destination address of a packet header of the data packet.

3. The apparatus of claim 1, wherein the packet flow path generator is to identify the set by identifying a set of network switch ports for each network switch in the set of network switches.

4. The apparatus of claim 1, wherein the bandwidth calculator is to determine the first number of data lines by:
    calculating a bandwidth to execute the packet flow;
    determining a third number of data lines connecting the first virtualized server and the second virtualized server;
    determining a data speed of each of the third number of data lines; and
    determining the first number of data lines based on the bandwidth and the third number of data lines.

5. The apparatus of claim 1, wherein the policy includes at least one of a quality of service parameter and an equal-cost multi-path routing hash policy of a network switch in the set.

6. The apparatus of claim 1, wherein the policy is an equal-cost multi-path (ECMP) routing hash policy, and the policy adjustor is to adjust the ECMP routing hash policy by:
    adjusting a parameter of the ECMP routing hash policy based on the second number of data lines; and
    executing a hash algorithm associated with the ECMP routing hash policy based on the adjusted parameter to distribute the packet flow among the second number of data lines.

7. A method comprising:
    determining that a first virtualized server is preparing to migrate to a second virtualized server based on a data packet;
    identifying a set of network switches between the first virtualized server and the second virtualized server when the first virtualized server is in a different rackmount server than the second virtualized server;
    determining a first number of data lines to execute a packet flow corresponding to the migration based on a packet flow size of the packet flow and data speeds associated with the first number of data lines, the first number of data lines associated with the set of network switches;
    reducing the first number of data lines to a second number of data lines when the first number of data lines exceeds a threshold, the second number of data lines to not exceed the threshold; and
    adjusting a policy of one or more network switches in the set to prioritize the packet flow by executing the packet flow with the second number of data lines.

8. The method of claim 7, wherein identifying the set of network switches is based on a source address and a destination address of a packet header of the data packet.

9. The method of claim 7, wherein identifying the set includes identifying a set of network switch ports for each network switch in the set of network switches.

10. The method of claim 7, wherein determining the first number of data lines includes:
    calculating a bandwidth to execute the packet flow;
    determining a third number of data lines connecting the first virtualized server and the second virtualized server;
    determining a data speed of each of the third number of data lines; and determining the first number of data lines based on the bandwidth and the third number of data lines.

11. The method of claim 7, wherein the policy includes at least one of a quality of service parameter and an equal-cost multi-path routing hash policy of a network switch in the set.

12. The method of claim 7, wherein the policy is an equal-cost multi-path (ECMP) routing hash policy, and further including adjusting the ECMP routing hash policy by:
adjusting a parameter of the ECMP routing hash policy based on the second number of data lines; and
executing a hash algorithm associated with the ECMP routing hash policy based on the adjusted parameter to distribute the packet flow among the second number of data lines.

13. The method of claim 7, wherein the threshold is a first threshold, and further including adding a network switch to the set when a bandwidth associated with the packet flow satisfies a second threshold during an execution of the migration.

14. A non-transitory computer readable storage medium comprising instructions which, when executed, cause a machine to at least:
determine that a first virtualized server is preparing to migrate to a second virtualized server based on a data packet;
identify a set of network switches between the first virtualized server and the second virtualized server when the first virtualized server is in a different rack-mount server than the second virtualized server;
determine a first number of data lines to execute a packet flow corresponding to the migration based on a packet flow size of the packet flow and data speeds associated with the first number of data lines, the first number of data lines associated with the set of network switches;
reduce the first number of data lines to a second number of data lines when the first number of data lines exceeds a threshold, the second number of data lines to not exceed the threshold; and
adjust a policy of one or more network switches in the set to prioritize the packet flow by executing the packet flow with the second number of data lines.

15. The non-transitory computer readable storage medium of claim 14, wherein the instructions, when executed, cause the machine to identify the set of network switches based on a source address and a destination address of a packet header of the data packet.

16. The non-transitory computer readable storage medium of claim 14, wherein the instructions, when executed, cause the machine to identify the set by identifying a set of network switch ports for each network switch in the set of network switches.

17. The non-transitory computer readable storage medium of claim 14, wherein the instructions, when executed, cause the machine to determine the first number of data lines by:
calculating a bandwidth to execute the packet flow;
determining a third number of data lines connecting the first virtualized server and the second virtualized server;
determining a data speed of each of the third number of data lines; and
determining the first number of data lines based on the bandwidth and the third number of data lines.

18. The non-transitory computer readable storage medium of claim 14, wherein the policy includes at least one of a quality of service parameter or an equal-cost multi-path (ECMP) routing hash policy of a network switch in the set, and the instructions, when executed, cause the machine to adjust at least one of the quality of service parameter or the ECMP routing hash policy.

19. The non-transitory computer readable storage medium of claim 14, wherein the policy is an equal-cost multi-path (ECMP) routing hash policy, and the instructions, when executed, cause the machine to adjust the ECMP routing hash policy by:
adjusting a parameter of the ECMP routing hash policy based on the second number of data lines; and
executing a hash algorithm associated with the ECMP routing hash policy based on the adjusted parameter to distribute the packet flow among the second number of data lines.

20. The non-transitory computer readable storage medium of claim 14, wherein the threshold is a first threshold, and the instructions, when executed, cause the machine to add a network switch to the set when a bandwidth associated with the packet flow satisfies a second threshold during an execution of the migration.

21. An apparatus comprising:
a packet analyzer to determine that a packet flow between a first virtualized server and a second virtualized server corresponds to an elephant flow based on a data packet;
a packet flow path generator to identify a set of network switches between the first virtualized server and the second virtualized server when the elephant flow is determined to be optimized;
a bandwidth calculator to:
determine a first number of data lines to execute the packet flow based on a packet flow size of the packet flow and data speeds associated with the first number of data lines, the first number of data lines associated with the set of network switches; and
reduce the first number of data lines to a second number of data lines when the first number of data lines exceeds a threshold, the second number of data lines to not exceed the threshold; and
a policy adjustor to adjust a policy of one or more network switches in the set to prioritize the packet flow by executing the packet flow with the second number of data lines.

22. The apparatus of claim 21, wherein the packet flow path generator is to identify the set of network switches based on a source address and a destination address of a packet header of the data packet.

23. The apparatus of claim 21, wherein the packet flow path generator is to identify the set by identifying a set of network switch ports for each network switch in the set of network switches.

24. The apparatus of claim 21, wherein the bandwidth calculator is to determine the first number of data lines by:
calculating a bandwidth to execute the packet flow;
determining a third number of data lines connecting the first virtualized server and the second virtualized server;
determining a data speed of each of the third number of data lines; and
determining the first number of data lines based on the bandwidth and the third number of data lines.

25. The apparatus of claim 21, wherein the policy includes at least one of a quality of service parameter or an equal-cost multi-path (ECMP) routing hash policy of a network switch in the set, and the policy adjustor is to adjust at least one of the quality of service parameter or the ECMP routing hash policy.

26. The apparatus of claim 21, wherein the policy is an equal-cost multi-path (ECMP) routing hash policy, and the policy adjustor is to adjust the ECMP routing hash policy by:
- adjusting a parameter of the ECMP routing hash policy based on the second number of data lines; and
- executing a hash algorithm associated with the ECMP routing hash policy based on the adjusted parameter to distribute the packet flow among the second number of data lines.

* * * * *